(12) United States Patent
Biswas et al.

(10) Patent No.: US 11,600,006 B2
(45) Date of Patent: Mar. 7, 2023

(54) DEEP NEURAL NETWORK ARCHITECTURE FOR IMAGE SEGMENTATION

(71) Applicant: HERE Global B.V., Eindhoven (NL)

(72) Inventors: Souham Biswas, Gurgaon (IN); Sanjay Kumar Boddhu, Aurora, IL (US)

(73) Assignee: HERE Global B.V., Eindhoven (NL)

(*) Notice: Subject to any disclaimer, the term of this patent is extended or adjusted under 35 U.S.C. 154(b) by 1168 days.

(21) Appl. No.: 16/171,814

(22) Filed: Oct. 26, 2018

(65) Prior Publication Data
US 2020/0134833 A1 Apr. 30, 2020

(51) Int. Cl.
| | |
|---|---|
| *G06T 7/187* | (2017.01) |
| *G06N 5/04* | (2006.01) |
| *G05D 1/02* | (2020.01) |
| *G06N 3/04* | (2006.01) |
| *G06V 10/26* | (2022.01) |
| *G06N 5/046* | (2023.01) |

(52) U.S. Cl.
CPC .......... *G06T 7/187* (2017.01); *G05D 1/0246* (2013.01); *G06N 3/0454* (2013.01); *G06N 5/046* (2013.01); *G06V 10/267* (2022.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 8,588,544 | B2* | 11/2013 | Lei | G06T 5/003 |
| | | | | 382/266 |
| 10,303,980 | B1* | 5/2019 | Kim | G06K 9/6262 |
| 2017/0243053 | A1* | 8/2017 | Li | G06T 7/143 |
| 2017/0287137 | A1* | 10/2017 | Lin | G06N 3/0454 |
| 2018/0165551 | A1* | 6/2018 | Roh | G06V 10/82 |
| 2018/0268250 | A1* | 9/2018 | Drozdova | G06V 10/82 |

(Continued)

FOREIGN PATENT DOCUMENTS

| | | | | |
|---|---|---|---|---|
| CN | 107993255 | A * | 5/2018 | ............. G06T 7/269 |
| CN | 107403197 | B * | 1/2020 | ............ G06K 9/6256 |
| WO | WO2017150204 | A1 | 9/2017 | |

OTHER PUBLICATIONS

CN 107993255 A [Machine Translation] (Year: 2018).*

(Continued)

*Primary Examiner* — Michelle M Entezari
(74) *Attorney, Agent, or Firm* — Lempia Summerfield Katz LLC

(57) ABSTRACT

An apparatus and method for encoding objects in a camera-captured image with a deep neural network pipeline including multiple convolutional neural networks or convolutional layers. After identifying at least a portion of the camera-capture image, a first convolutional layer is applied to the at least the portion of the camera-captured image and multiple subregion representations are pooled from the output of the first convolutional layer. One or more additional convolutions are performed. At least one deconvolution is performed and concatenated with the output of one or more convolutions. One or more final convolutions are performed. The at least the portion of the camera-captured image is classified as an object category in response to an output of the one or more final convolutions.

18 Claims, 25 Drawing Sheets

(56) References Cited

U.S. PATENT DOCUMENTS

| | | | | |
|---|---|---|---|---|
| 2019/0004533 | A1* | 1/2019 | Huang | H04N 5/2258 |
| 2019/0073553 | A1* | 3/2019 | Yao | G06N 3/082 |
| 2019/0205758 | A1* | 7/2019 | Zhu | G06K 9/6256 |
| 2019/0375261 | A1* | 12/2019 | Johansson | G06V 20/588 |
| 2020/0034782 | A1* | 1/2020 | Hsieh | G06N 3/08 |
| 2021/0136993 | A1* | 5/2021 | Revelli | A01D 75/00 |

OTHER PUBLICATIONS

CN 107403197 B [Machine Translation] (Year: 2020).*
Noh, Hyeonwoo, Seunghoon Hong, and Bohyung Han. "Learning deconvolution network for semantic segmentation." Proceedings of the IEEE international conference on computer vision. 2015. (Year: 2015).*
Badrinarayanan, Vijay, Alex Kendall, and Roberto Cipolla. "Segnet: A deep convolutional encoder-decoder architecture tor image segmentation " arXiv preprint arXiv:1511.00561 (2015).
Chen, Liang-Chieh, et al. "Deeplab: Semantic image segmentation with deep convolutional nets, atrous convolution, and fully connected crfs." IEEE transactions on pattern analysis and machine intelligence 40.4 (2018): 834-848.
Chen, Liang-Chieh, et al. "Rethinking atrous convolution for semantic image segmentation." arXiv preprint arXiv:1706.05587 (2017).
Chen, Liang-Chieh, et al. "Semantic image segmentation with deep convolutional nets and fully connected CRFs." arXiv preprint arXiv:1412.7062 (2014).
Kamran, Sharif Amit, Muhammad Hasan, and Ali Shihab Sabbir. "Efficient yet deep convolutional neural networks for semantic segmentation." arXiv preprint arXiv:1707.08254 (2017).
Lin, Guosheng, et al. "RefineNet: Multi-path Refinement Networks for High-Resolution Semantic Segmentation." Cvpr. vol. 1. No. 2. 2017.
Long, Jonathan Leonard. Understanding and Designing Convolutional Networks for Local Recognition Problems. Diss. UC Berkeley, 2016.
Long, Jonathan, Evan Shelhamer, and Trevor Darrell. "Fully convolutional networks for semantic segmentation." Proceedings of the IEEE conference on computer vision and pattern recognition 2015.
Mazzini, Davide. "Guided Upsampling Network for Real-Time Semantic Segmentation." arXiv preprint arXiv:1807.07466 (2018).
Munoz-Bulnes, Jesús, et al. "Deep fully convolutional networks with random data augmentation for enhanced generalization in road detection." Intelligent Transportation Systems (ITSC), 2017 IEEE 20th International Conference on. IEEE, 2017.
Patil, Sahana, and Sandeep Kumar. "Semantic Image Segmentation by Deep Convolution Nets and Watershed Transformation." International Journal of Innovative Research in Computer and Communication Engineering, vol. 5, No. 5, pp. 10155-10160. www.ijircce.com, www.ijircce.com/upload/2017/may/242_MR160905-Sahana_Paper_V1.pdf.
Peng, Chao, et al. "Large kernel matters—improve semantic segmentation by global convolutional network." Computer Vision and Pattern Recognition (CVPR), 2017 IEEE Conference on. IEEE, 2017.
Ros Martí, Marc. Deep convolutional neural network architecture for effective Image analysis. MS thesis. Universitat Politècnica de Catalunya, 2017.
Yu, Fisher, and Vladlen Koltun. "Multi-scale context aggregation by dilated convolutions." arXiv preprint arXiv:1511.07122 (2015).
Zhao, Hengshuang, et al. "Pyramid scene parsing network." IEEE Conf. on Computer Vision and Pattern Recognition (CVPR). 2017.

* cited by examiner

US 11,600,006 B2

DEEP NEURAL NETWORK ARCHITECTURE FOR IMAGE SEGMENTATION

FIELD

The following disclosure relates to image segmentation, and more specifically, to a deep convolutional network for pixel-wise classification of images.

BACKGROUND

Object detection is an important task in computer vision for computers to understand the world and make reactions, and has great potential to emerging applications such as automatic driving. In the past few years, deep convolutional neural networks (CNNs) have shown promising results on object detection. Although CNNs have been demonstrated to be effective on object detection, existing methods often do not detect small objects as well as they do for the large objects. Moreover, the size of input for those networks is limited by the amount of memory available on graphics processing units (GPUs).

SUMMARY

The following embodiments solve these challenges for small object detection with low memory requirements. In one embodiment, a method for encoding objects in a camera-captured image with a deep neural network pipeline includes identifying at least a portion of the camera-capture image, applying a first convolutional neural network to the at least the portion of the camera-captured image at a first stage, pooling, at a second stage, a plurality of subregion representations from an output of the first convolutional neural network for the first stage, performing, at a third stage, at least one convolution of an output of the second stage, performing, at a fourth stage, at least one deconvolution from the output of the first stage or the output of the second stage, concatenating, at a fifth stage, the output of the fourth stage and the output of the third stage, applying a second convolutional neural network to the output of the fifth stage, and classifying the at least the portion of the camera-captured image as an object category in response to an output of the second convolutional neural network.

In another implementation, an apparatus includes a first convolution module, a second convolution module, a third convolution module, a first deconvolution module, and a second deconvolution module. The first convolution module is configured to apply a first convolution to the at least a portion of a camera-captured image. The second convolution module is configured to pool a plurality of subregion representations from an output of the first convolutional module. The first deconvolution module is configured to perform at least one deconvolution from the output of the first convolution module. The second deconvolution module is configured to perform at least one deconvolution from the output of the second convolution module. The third convolution module configured to apply a second convolution of an output of the first deconvolution module concatenated with an output of the second deconvolution module. At least the portion of the camera-captured image is classified in response to an output of the third convolution module.

In another implementation, a non-transitory computer readable medium includes instructions that when executed by a process are configured to identify at least a portion of an image, applying a first convolutional neural network to the at least the portion of the image at a first stage, pooling, at a second stage, a plurality of subregion representations from an output of the first convolutional neural network for the first stage, performing, at a third stage, at least one convolution of an output of the second stage, performing, at a fourth stage, at least one deconvolution from the output of the first stage to the output of the second stage, concatenating, at a fifth stage, the output of the fourth stage and the output of the third stage, applying a second convolutional neural network to the output of the fifth stage, and classifying the at least the portion of the image as an object category in response to an output of the second convolutional neural network.

BRIEF DESCRIPTION OF THE DRAWINGS

Exemplary embodiments of the present invention are described herein with reference to the following drawings.

DETAILED DESCRIPTION

Figure 1:
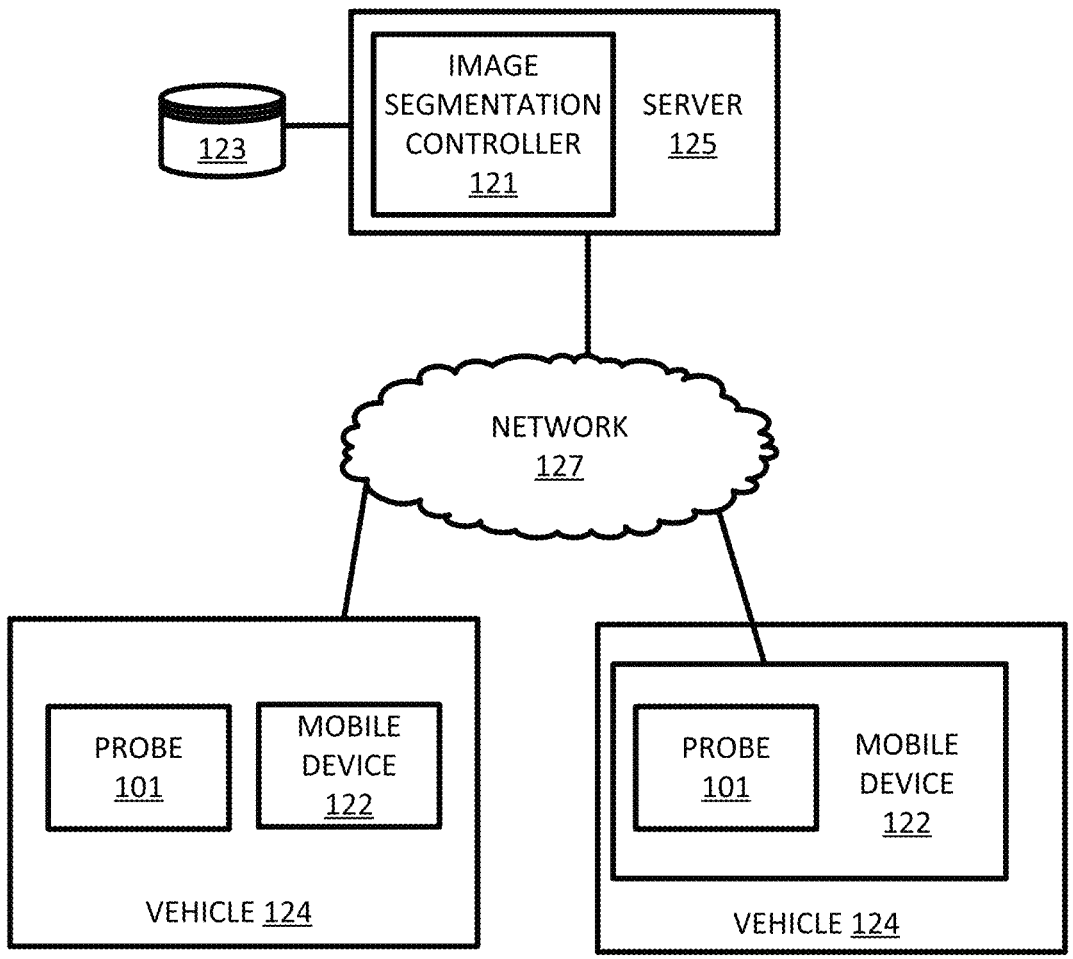
FIG. 1 illustrates an example system for image segmentation.

Street-side images are images collected from the perspective of a roadway or another path. While driving, the human vision system effortlessly identifies everything in the field of vision ranging from roads, sidewalks, pedestrians, traffic-lights, signs, and other features or objects. However, discerning these objects or features from camera-captured images by a computer is quite a complex task.

Street-side images may be used in a variety of technologies. For example, identified features or objects may be applied to autonomous driving systems or assisted driving systems. The autonomous driving systems may generate driving commands in response to the location of objects. The assisted driving systems may generate driver warnings or supplemental assistance commands in response to the locations of objects. Localization also may also be performed in response to the identified objects or features. For example, the location of a user or vehicle may be determined according to the known location of objects detected in the vicinity of the user or vehicle. Finally, the identified objects or features from the street-side images may be applied to three-dimensional models and mapping database.

The following embodiments include image segmentation through a deep neural network architecture pipeline that takes an image as an input and classifies each pixel to a semantic class (e.g., road, pedestrian, vegetation, or other object classifications) semantically mapping it to the object to a classification. Through parallel paths of convolution and deconvolution layers as well as the exchange of learned filter values between layers, a variety of improvements are realized over existing image segmentation techniques, including, for example, a reduction in image distortions and an improvement in accuracy.

The following embodiments also include a novel approach to transfer learning for convolutional neural nets through the method of filter kernel interpolation. Transfer learning is the process of utilizing existing trained models as a base to build new models. The methodology posited herein allows for much better initialization and faster convergence.

The following embodiments relate to several technological fields including but not limited to navigation, autonomous driving, assisted driving, traffic applications, and other location-based systems. The following embodiments achieve advantages in each of these technologies because an increase in the accuracy of object classifications improves the effectiveness, efficiency, and speed of specific application in these technologies. In each of the technologies of navigation, autonomous driving, assisted driving, traffic applications, and other location-based systems, identifications of objects in collected images improves the technical performance of the application. In addition, users of navigation, autonomous driving, assisted driving, traffic applications, and other location-based systems are more willing to adopt these systems given the technological advances in object classification.

FIG. 1 illustrates an example system for image segmentation. In FIG. 1, one or more vehicles 124 are connected to the server 125 though the network 127. The server 125 includes an image segmentation controller 121 that identifies one or more physical objects or features in an image. The physical objects may include road objects, street furniture, road signs, or other vehicles. The road objects may include objects associated with the road that are indicative of the path of the road, including reflectors, curbs, road boundary lines, road center lines, or other objects. The street furniture may include items associated with the street including benches, traffic barriers, streetlamps, traffic lights, traffic signs, bus stops, tram stops, taxi stands, or other items. The features may include roadways, vegetation, topographical aspects, or other items. The features may be described as a shape, height, or texture. The features may include a portion of an object or characteristic of an object. Example portions of objects may include a particular side or surface of any of these objects. Example object characteristics may include a dimension of the object, a size of the object, a color of the object, a shape of the object, or other characteristics.

The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the geographic database 123. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

Each vehicle 124 and/or mobile device 122 may include a camera or other sensor configured to detect and collect data for the surroundings of the vehicle 124 and/or mobile device 122. The camera or other sensor data may be coupled with image processing circuitry to analyze the data. Images may be collected by a camera or a charge coupled device (CCD) that is traveling along the roadway. The camera may be a visible spectrum camera, an infrared camera, an ultraviolet camera or another camera. The camera may be mounted on the vehicle 124 driven along the roadway.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

Each image or point cloud may be associated with or stored with a timestamp and/or a location stamp based on the time and location that the image was collected. In another example, the images may be collected in response to time intervals (e.g., every 0.5 second, every second) as the vehicle travels along the roadway such that the series of images are at a predetermined time interval. In this example, the geographic distance between images varies as the speed of the camera or collection vehicle changes. The timestamp may be omitted when the images are collected at the predetermined time interval. In another example, the images may be collected in response to location intervals (e.g., every meter, every 10 feet) as the vehicle travels along the roadway such that the series of images are at a predetermined location interval. In this example, the time between images varies as the speed of the camera or the collection vehicle changes. The location stamp may be omitted when the images are collected at the predetermined location interval.

The probe data forming the location stamp may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may be the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
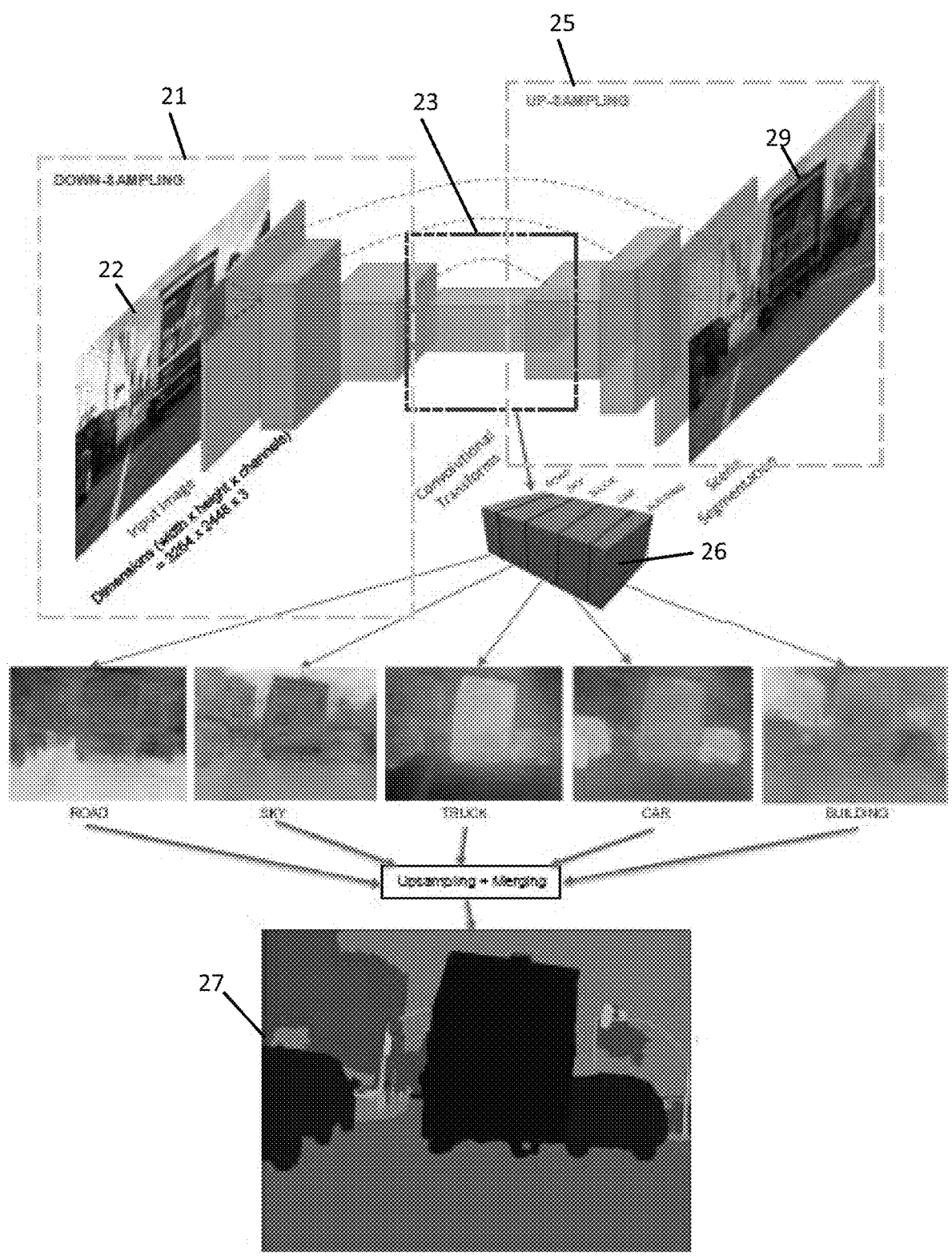
FIG. 2 illustrates an example image segmentation sequence.

FIG. 2 illustrates an example framework for image segmentation. The purpose of image segmentation is to label each pixel, or group of pixels, in the images collected by the mobile device 122 or vehicle 124 with a class of the object represented in the pixel or group of pixels. When each pixel is classified, the process may be referred to as dense segmentation. When subsets of pixels are classified, the process may be referred to as sparse image segmentation. In a simple example of a grayscale image, the input image includes data having dimensions of height×width×1, and in the example of a color image (e.g., RGB), the input image includes data having dimensions of height×width×3. In either case, the output segmentation map for the dense segmentation has a single class label for each pixel represented as height×width×1, and the output segmentation map for the sparse segmentation has a single class for each subset of pixels (height×width/subset size)×1.

In a downsampling portion 21, a collected image or input image 22 is processed to reduce the resolution and/or spatial resolution of the image. The downsampling portion 21 may analyze a subset of pixels and convert the subset of pixels to a single pixel. For example, the downsampling portion 21 may examine pixel values for the subset of values and average the pixel values for the subset of pixel values as a single pixel value. In other examples, the subset of pixel values is compared to a set of templates to select a single pixel value. The downsampling portion 21 may include multiple downsampling layers that perform independent downsampling operations.

The convolutional portion 23 includes one or more convolutional layers to produce a confidence heatmap mask set 26 for each of the possible classifications of the pixels. As illustrated in FIG. 2, the classifications of the pixels include classifications of road, sky, truck, car, and building. The classification is performed by a classifier module or device. The classifier may be a convolutional neural network (CNN). In some example, portions or all of the classification process may be performed by another classifier such as a random forest, a decision tree, or another model. The classifier may classify a pixel by examining the pixels surrounding the classified pixel (e.g., a patch). The classifier may classify a pixel by examining the whole image or a portion of the image. For example, the CNN may be trained to identify pixels according to inputs from the whole image or portions of the image.

The classifier may generate a heatmap mask 26 for each type of object that is classified or identified from the input image 22. As shown in FIG. 2, the heatmap masks 26 may include a road mask, a sky mask, a truck mask, a car mask, and a building mask. Each downsampled heatmap mask 26 is an equivalent grayscale image where intensity of each pixel denotes the probability of that pixel belonging to the corresponding class. For example, as illustrated in FIG. 2, whiter intensity represents a higher confidence level and darker intensity represents a lower confidence.

The heatmap masks 26 for the various classifications are merged and provided to the upsampling portion 25. The upsampling portion 25 includes one or more convolutional layers that increase the resolution of the image.

An output image 29 includes the same resolution as the input image 22 and includes encoding for the various classifications determined by the heatmap masks 26. The output image 29 may include a code for each pixels that represents the object classification or prediction for that pixel. The output image 29 may be represented by a color value or intensity that corresponds to the object classification or prediction for that pixel. That is, in the output image 29, different colors may correspond to different object classifications as determined in the convolutional portion 23.

The pixelwise Image segmentation including may assign a semantic label to each and every pixel, or substantially every pixel, in a given image or portion of the image. These labels may be numbers denoting the respective semantic classification. Table 1 includes 19 example classes for segmenting an object as well as example colors for representing the classes in the intermediate image 27 or output image 29. The colors may be an RGB code including a red value, a green value, and a blue vale.

| Class Label Name | Class Label ID | Color RGB Code (R, G, B) |
|---|---|---|
| Road | 0 | 128, 64, 128 |
| Sidewalk | 1 | 244, 35, 231 |
| Building | 2 | 69, 69, 69 |
| Wall | 3 | 102, 102, 156 |
| Fence | 4 | 190, 153, 153 |
| Pole | 5 | 153, 153, 153 |
| Traffic Light | 6 | 250, 170, 29 |
| Traffic Sign | 7 | 219, 219, 0 |
| Vegetation | 8 | 106, 142, 35 |
| Terrain | 9 | 152, 250, 152 |
| Sky | 10 | 69, 129, 180 |
| Person | 11 | 219, 19, 60 |
| Rider | 12 | 255, 0, 0 |
| Car | 13 | 0, 0, 142 |
| Truck | 14 | 0, 0, 69 |
| Bus | 15 | 0, 60, 100 |

| Class Label Name | Class Label ID | Color RGB Code (R, G, B) |
| --- | --- | --- |
| Train | 16 | 0, 79, 100 |
| Motorcycle | 17 | 0, 0, 230 |
| Bicycle | 18 | 199, 10, 32 |
| IGNORE | 255 | 255, 255, 255 |

In this example of the segmented image, classified pixels are assigned a value from 0 to 18 (both inclusive) mapping the pixels to the appropriate class. Therefore, a pixel located at (x, y) in the segmented image having a value of 6 indicates that the pixel at (x, y) in the original image belongs to a traffic light. The unclassified pixels for which no semantic label could be assigned may be assigned the value of 255, which corresponds to white. Other values may be used for the ignore label or one or more of the other labels.

An intermediate image 27, or segmented image, may be encoded from the heatmap masks 26. A color may be assigned to each heatmap mask 26 and the color value or intensity that corresponds to the object classification or prediction in the heatmap mask 26 is colorized by the assigned color in the intermediate image 27. For example, the pixels having a value above a threshold in each heatmap mask 26 are colorized using the assigned color for that heatmap mask 26. Thus, the intermediate image 27 includes a first color for the pixels in the road heatmap mask above the threshold, a second color for the pixels in the sky heatmap mask above the threshold, a third color for the pixels in the truck heatmap mask above the threshold, a fourth color for the pixels in the car heatmap mask above the threshold, and a fifth color for the pixels in the road heatmap mask above the threshold.

The upsampling portion 25 returns the size, resolution and/or spatial resolution of the images to that of the input image 22. The upsampling may be combined with a convolution such as a fractionally strided convolution or a transposed convolution.

The image segmentation controller 121 may send data for the classified pixels and object categories to one or more mobile device 122 or vehicles 124. In response, a display may present the output image 29 included colors or other indicia encoded from the object categories. The mobile device 122 or vehicles 124 may provide localization in response to the object categories. The pattern of objects may be compared to ground truth objects stored in database 123 to determine the position of the mobile device 122 or vehicles 124 in response to the classifications determined by the image segmentation controller 121. The mobile device 122 or vehicles 124 may provide navigation in response to the classifications. The navigation may include turn-by-turn instructions that avoid the classified objects. The navigation may include turn-by-turn instructions that approach or pass the classified objects. The navigation may include one or more destination defined according to the classified objects. The mobile device 122 or vehicles 124 may provide autonomous or assisted driving in response to the classified objects. A warning may be provided to the user according to the identity of the classified objects. A driving instruction may be provided to the vehicle in order to avoid or keep a distance from the classified objects according to the identity of the classified objects.

Figure 3:
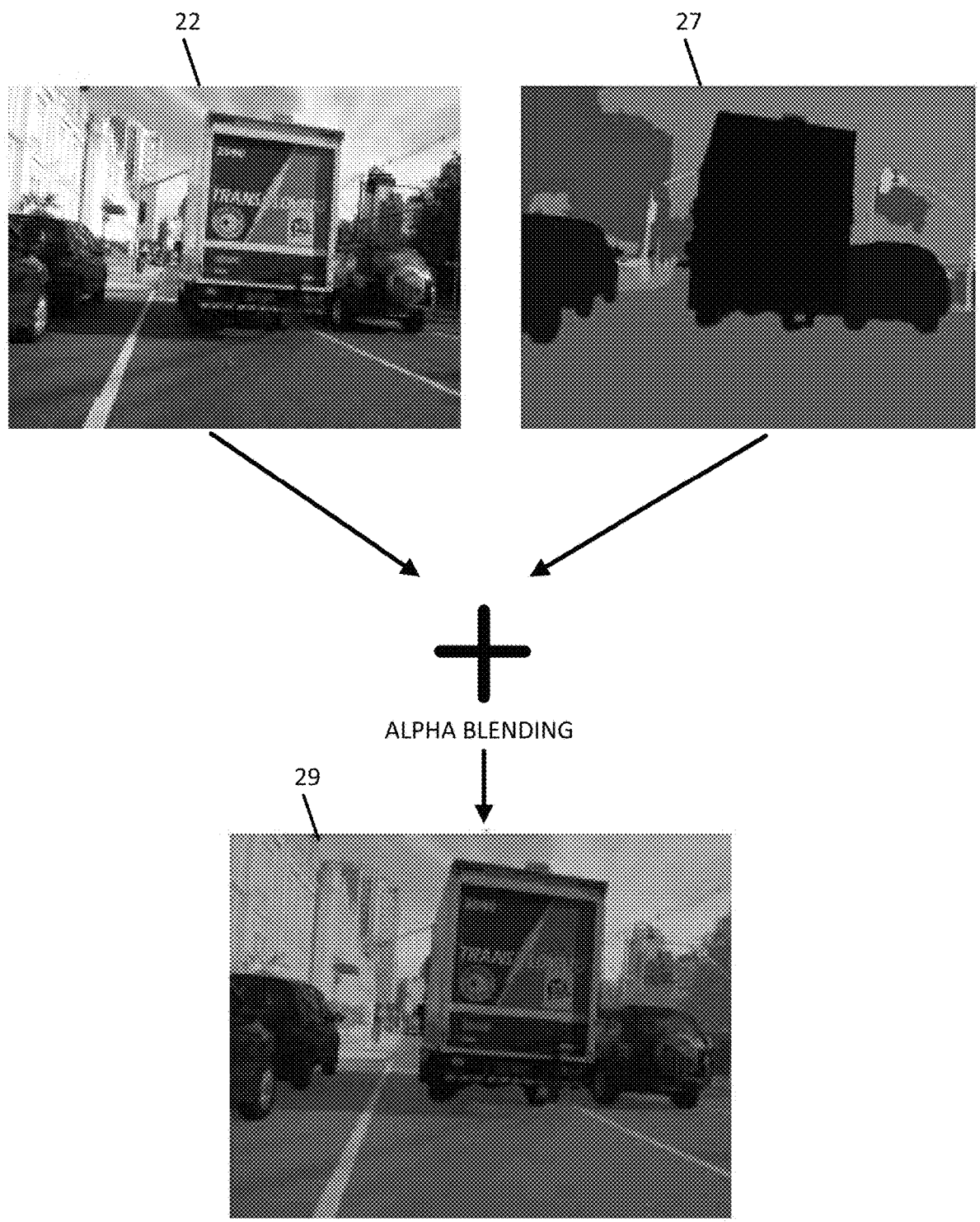
FIG. 3 illustrates alpha blending of images.

FIG. 3 illustrates alpha blending of the intermediate image 27 and the input image 22 to form the output image 29 as a segmentation visual overlay. The alpha blending may include converting colors assigned in the intermediate image 27 to translucent colors. Converting colors may include adjusting one or more pixel characteristics to create the translucent colors. The translucent color is a foreground color that is combined with background colors from the input image 22. The translucency in the alpha blending may be controlled according to a weighted average of a foreground weight for the foreground color and a background weight for the background color. The output image 29 includes the translucent colors selected to indicate the classification of objects in the image segmentation.

Figure 4:
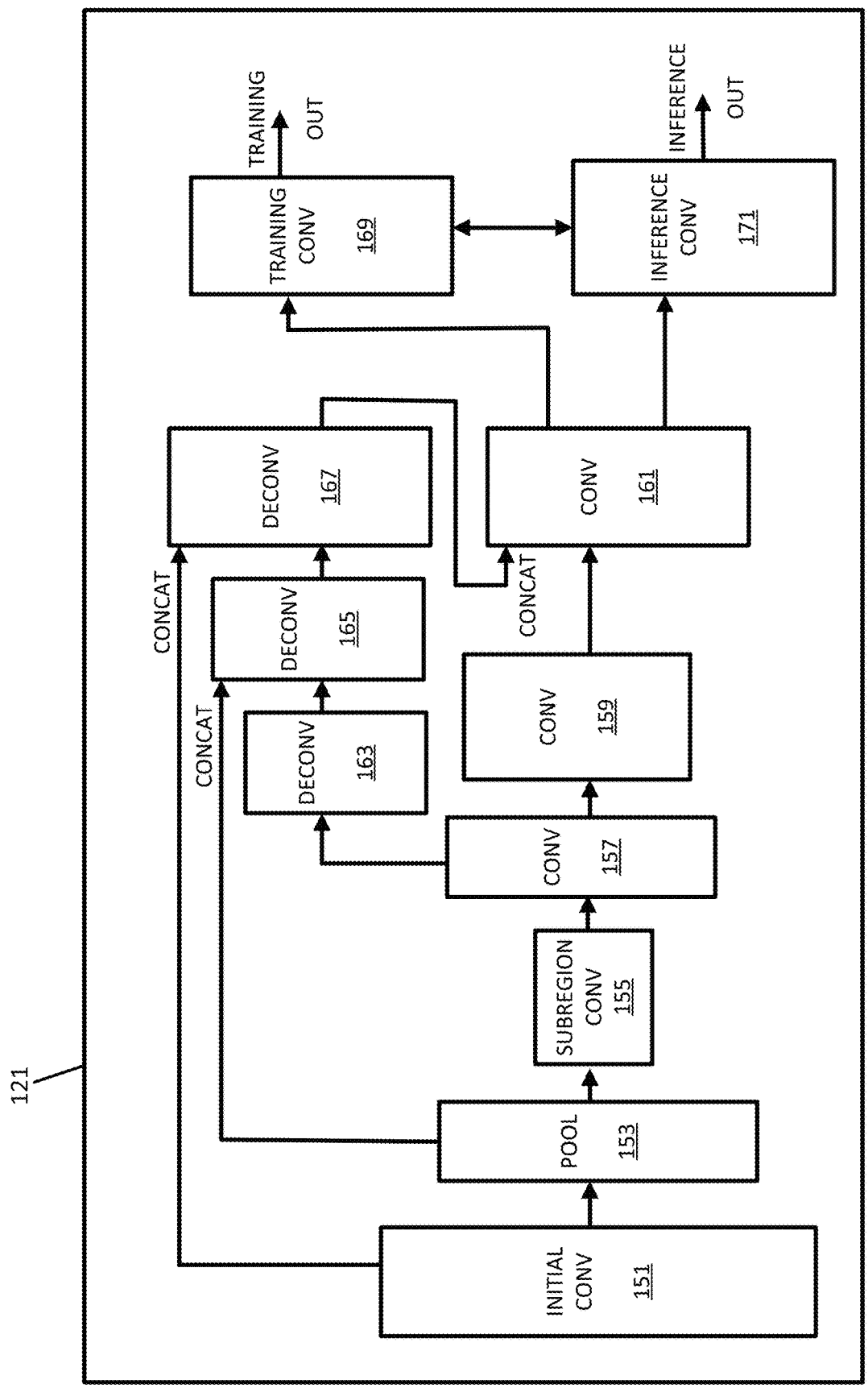
FIG. 4 illustrates components of the image segmentation controller.

FIG. 4 illustrates components of the image segmentation controller 121. The image segmentation controller 121 may include one or more graphics processing unit (GPU) or another specialized electronic circuit to generate, store, and/or transmit images in a frame buffer. The read capabilities of the GPU may have a predetermined number of bytes that are read in a memory access operation. The image segmentation controller 121 may select one or more dimensions of the convolution layers or filters according to the predetermined number of bytes. For example, at least one, or each, dimension of the convolution layers or filters may be selected to be a multiple of the predetermined number of bytes or a power of the predetermined number of bytes.

The image segmentation controller 121 may include parallel paths that process large blocks of data simultaneously. The server 125 may include a printed circuit board, video card or other devices embedded with the image segmentation controller 121 or one or more GPUs. In some examples, a separate GPU or dedicated portion of a GPU implements each of the blocks in the image segmentation controller 121.

The image segmentation controller 121 may include an architecture with multiple convolution modules or devices that are arranged in a particular order that provides multiple advantages and benefits to the system. The image segmentation controller 121 may include an initial convolution module 151, a pooling module 153, a subregion convolution module 155, convolutional module 157, convolutional module 159, convolutional module 161, deconvolutional module 163, deconvolutional module 165, and deconvolutional module 167. Outputs of the convolution modules and deconvolution modules may be referred to as feature maps. The image segmentation controller 121 includes an output of the training convolution module 169 and an output of the inference convolution module 171.

The architecture includes a three prong shape. An initial forward feeding prong, or early forward feeding prong stems from the initial convolution module 151 to the deconvolutional module 167 and from the pooling module 153 to the deconvolutional module 165. The primary forward feeding prong provides long range residual connections to utilize low-level features captured at shallow layers. For example, the shallow layers (e.g., at initial convolution module 151) captures edge, corners, and simple features, as opposed to complex features such as roads or other objects, and provides these simple features to the later stage(s) of the deconvolution layers (e.g., deconvolutional module 167). On the other hand, and in addition, a secondary forward feeding prong, or later forward feeding prong, stems from the convolutional module 157 to the deconvolutional module 163. The secondary forward feeding prong provides complex features to the later stage(s) of the deconvolution layers (e.g., deconvolutional module 167), which are combined with the simple features from the primary forward feeding prong. The initial forward feeding prong and the secondary forward feeding prong converge to form the deconvolutional path including the deconvolutional module 163, deconvolution module 165, and deconvolution module 167.

The pyramid parsing prong stems from the pooling module 153 to the subregion convolution module 155 and on to the convolutional module 157 and the convolutional module 159. The primary forward feeding prong, the secondary forward feeding prong, and the pyramid parsing prong reconverge at convolutional module 161, which provides data to the training convolution module 169 and the inference convolution module 171.

The deconvolutional layers (e.g., deconvolutional module 163, deconvolutional module 165, and deconvolutional module 167) utilize contextual and semantic information from the image at multiple levels. The motivation for this follows from the fact that the layers at the beginning extract low-level features (e.g., edges, corners, and other simple shapes) and the features gradually keep getting semantically richer with depth (layers towards the end capture high-level features (e.g., squares, wheels, circles, regions, and other complex shapes).

The image segmentation controller 121 may operate in a plurality of modes including a training mode and an inference mode. In the training mode, the output of the image segmentation controller 121 is provided by the training convolution module 169. In the inference mode, the output of the image segmentation controller 121 is provided by the inference convolution module 171. The training mode and inference mode may be performed sequentially (e.g., first the training more then the inference mode) or simultaneously. In the training mode, the coefficient values for convolutional modules are defined or modified. For example, in the training mode values for the matrices for the filters or kernels used by the convolutional modules are calculated.

In the training mode, the ground truth for the input image is provided to the image segmentation controller 121. The ground truth includes the actual identities for the pixels in the input image. In one example, a human operator identifies the objects in the image and defines the class labels for the pixels associated with those objects in the image. That is, the operate may outline or highlight a truck in the image and designate class label 14.

In the training mode, the image segmentation controller 121 analyzes the ground truth and calculates values for the matrices for the filters or kernels used by the convolutional modules. These values are adjusted over multiple iterations. Eventually, the image segmentation controller 121 is able to analyze the input image, without knowledge of the ground truth, to estimate the same class labels provided by the ground truth.

In the inference mode, the image segmentation controller 121 provides classifications to additional images using the values for the matrices for the filters or kernels used by the convolutional modules that were determined in the training mode. In some examples, the training mode continues during the inference mode.

The image segmentation controller 121 may provide the input image to the initial convolutional module 151. The input image includes a matrix of pixel values. The convolutional module 151 includes a filter matrix that is convolved with the input image.

Figure 5A:
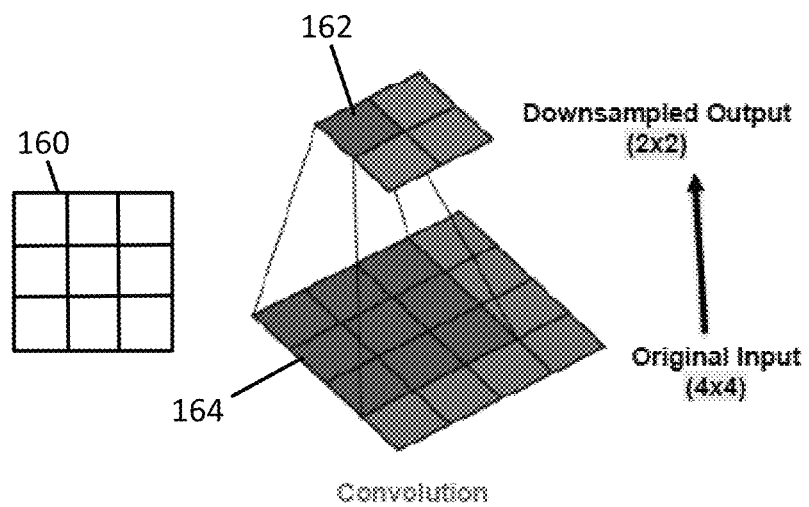
FIG. 5A includes an image and filter for convolution.

FIG. 5A includes an input image 164 and filter 160 for convolution. The input image 164 and the filter 160 are convolved by the image segmentation controller 121 to generate the output image 162 (output relative to the particular convolution operation or convolution module). The convolution of FIG. 5A represents the convolution performed by the convolution module 151 but matrices of other sizes, strides, kernels or other variables may be changed. The stride may be a fractional stride (e.g., half a stride or other fractional).

In the particular example of convolution module 151, the filter 160 may be a 3×3 filter that is applied with a stride of 1 to the input image 164. Thus for any 3×3 portion of the input image 164 the convolution produces a single pixel or cell in the matrix of the output image 162. Accordingly, the 5×5 input image 164 illustrated in FIG. 5A results in a 2×2 output image 162.

For the convolution process in convolution module 151 (as well as other convolution modules), the filter 160 is applied to the input image 164 in an iterative technique. The filter 160 is slid across the input image 164 according to a stride distance in a predetermined pattern. The predetermined pattern may start in the upper left corner, move from left to right incrementally by the stride, then down by the stride, then from right to left, and so on, until the entire input image 164 has been covered by the filter 160, or filtered.

During each iteration of the convolution, the image segmentation controller 121 performs a calculation for the filter 160 at the current position of the input image 164. In one example, the values from the filter 160 are multiplied by the corresponding values of the input image 164 (i.e., the value in the filter 160 at each position is multiplied by the same position in the input image 164). The products are summed. The sum of products is then applied as the value in the output image 162 at the position corresponding to the filter 160 at this iteration. The position in the output image 162 may correspond to the center of the filter 160.

Through this convolution, the size of the output image 162 is smaller than the size of the input image 164. That is the number of cells in the matrix of the output image 162 is less than the number of cells in the input image 164. The output image 162 has a smaller spatial resolution than that of the input image 164.

The output of the convolution module 151 is provided to the pooling module 153. The pooling module 153 is configured to capture image context at varying levels of coarseness. The levels of coarseness may be provided by different sized blocks or subregions. The different sized bocks may represent the shape of a pyramid. Larger sized blocks or subregions supply coarse aspects of the image. For example, global pooling information (e.g., vegetation, roads, sidewalks) are provided by the larger sized blocks. Smaller sized blocks or subregions supply finer aspects of the image. For example, finer details (e.g., riders on a bike/motorcycle). The pooling module 153 may combine or concatenate the different blocks of the pyramid. The pooling module 153 may concatenate the different sized blocks in an order (e.g., largest to smallest or smallest to largest) that generates a matrix having layers for the different sized blocks.

The output of the pooling module 153 is provided to the subregion convolution module 155. Referring to FIG. 5A, the subregion convolution module 155 includes an input image 164 (from the pooling module 153) and filter 160 for convolution. The input image 164 and the filter 160 are convolved by the image segmentation controller 121 to generate the output image 162 (output relative to the particular convolution operation or convolution module). The convolution of FIG. 5A represents the convolution performed by the convolution module 155 but matrices of other sizes, strides, kernels or other variables may be changed.

The output of the subregion convolution module 155 is provided to the convolution module 157. Referring to FIG. 5A, the convolution module 157 includes an input image 164 (from the pooling module 153) and filter 160 for convolution. The input image 164 and the filter 160 are convolved by the image segmentation controller 121 to generate the output image 162 (output relative to the particular convolution operation or convolution module). The convolution of FIG. 5A represents the convolution performed by the convolution module 157 but matrices of other sizes, strides, kernels or other variables may be changed.

The output of the convolution module 157 is provided to the convolution module 159. Referring to FIG. 5A, the convolution module 159 includes an input image 164 (from the convolution module 157) and filter 160 for convolution. The input image 164 and the filter 160 are convolved by the image segmentation controller 121 to generate the output image 162 (output relative to the particular convolution operation or convolution module). The coevolution of FIG. 5A represents the convolution performed by the convolution module 159 but matrices of other sizes, strides, kernels or other variables may be changed.

Figure 5B:
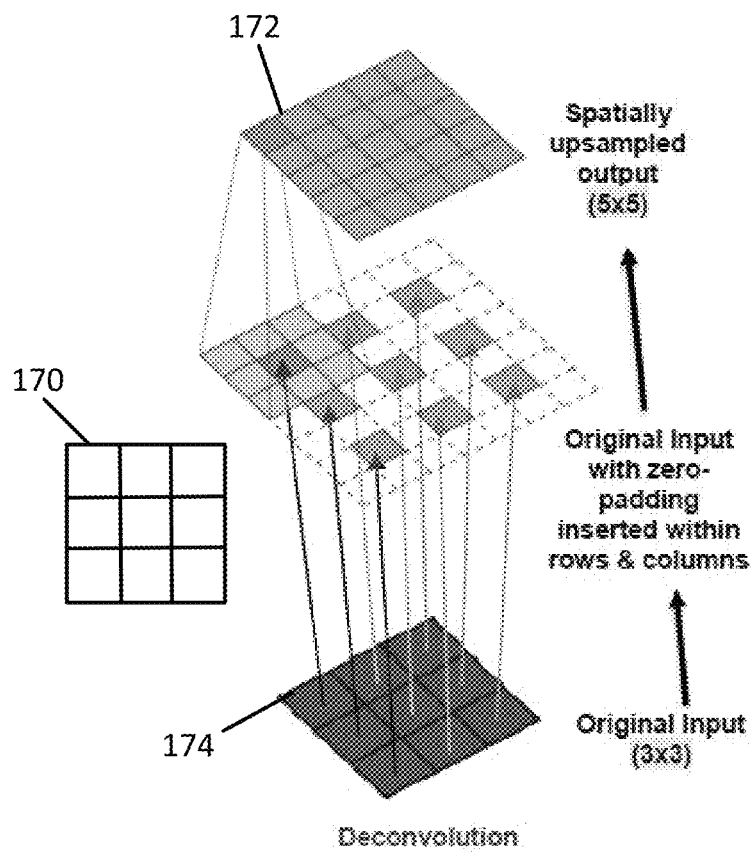
FIG. 5B includes an image and filter for deconvolution.

The initial forward feeding prong and the secondary forward feeding prong converge to form the deconvolutional path including the deconvolutional module 163, deconvolution module 165, and deconvolution module 167. FIG. 5B includes an input image 174 and a filter 170, which may be referred to as an inverse filter, for deconvolution to calculate output image 172. The image segmentation controller 121 is configured to deconvolve the inverse filter 170 and the input image 174 may both adjusting values of the image according to the values of the matrix of the filter 170 and inserting values into the image according to the filter 170. The input image 174 has a first that is smaller than the size of the output image 172, which is a spatially upsampled output.

The deconvolutional module 163, deconvolution module 165, and deconvolution module 167 should be distinguished from deconvolutional upsampling where a filter combines multiple adjacent matrix values in to one, which is then slid over the input image. The deconvolutional module 163, deconvolution module 165, and deconvolution module 167, performs this sequence but adjusts the sequence. Before the filter is slid across the image, the image is inflated or "blown up" by inserting 0-padding in between the rows and columns so that after the filter slides across this, the final output is spatially larger than the input or, in other words upsampled.

The deconvolutional module 163 is configured to modify the output of convolutional module 157 by increasing the size of the image before applying the filter 170. Rather than the specific output of the convolutional module 157, data from another deep layer may be used. The deep layers are the layers that occur after the subregion convolution module 155. The deconvolutional module 163 may insert one or more rows or columns of predetermined values to the image. The predetermined values may be 0 or black. Alternatively, the predetermined values may be 255 or white. The image segmentation controller 121 may insert a row of values between the first and second rows of the image and/or insert a column of values between the first and second columns of the image. Subsequent rows or columns may be inserted after each row, or alternatively, after each N set of rows, where N is an integer. After the values are inserted into the image, the image segmentation controller 121 applies the filter 170. When applying the filter 170 a fractional stride may be used to account for the inserted values.

During each iteration of the deconvolution, the image segmentation controller 121 perform a calculation for the filter 170 at the current position of the input image 174. In one example, the values from the filter 170 are multiplied by the corresponding values of the input image 174 after the predetermined values are inserted (i.e., the value in the filter 160 at each position is multiplied by the same position in the input image 164 including the inserted values). It is noted that if the inserted values are zeroes, then one or more values in the filter is multiplied by zero, which negates the effect of that portion of the filter. The products are summed. The sum of products is then applied as the value in the output image 172 at the position corresponding to the filter 170 at this iteration. The position in the output image 172 may correspond to the center of the filter 170. During convolution, the output image 172 is larger, or has a greater spatial resolution, than the input image 174. This is lessened though by the insertion of values to the input image 174. The output image 172 may be smaller than the input image with inserted values but larger than the original input image 174.

The deconvolutional module 165 and the deconvolutional module 167 perform similar deconvolutional processes similar to that illustrated in FIG. 5B. The deconvolutional module 165 is configured to concatenate the output of the deconvolutional module 163 with the output of the pooling module 153. Rather than the specific output of the pooling module 153, data from another shallow layer may be used. The shallow layers are the layers that occur before the subregion convolution module 155. The concatenation means that the data of the output of the deconvolutional module 163 is combined with the output of the pooling module 153 along a particular dimension. The data may be concatenated along the depth direction (e.g., along the number of channels, or in a channel-wise direction) rather than the spatial dimensions of the image. The deconvolutional module 165 is configured to increase the size of the concatenated data before applying the filter 170. The deconvolutional module 165 may insert one or more rows or columns of predetermined values to the image and then apply the filter 170.

The deconvolutional module 167 is configured to concatenate the output of the deconvolutional module 165 with the output of the initial convolution module 151. Rather than the specific output of the initial convolution module 151, data from another shallow layer may be used. The shallow layers are the layers that occur before the subregion convolution module 155. The data may be concatenated along the depth direction. The deconvolutional module 167 is configured to increase the size of the concatenated data before applying the filter 170. The deconvolutional module 167 may insert one or more rows or columns of predetermined values to the image and then apply the filter 170.

Because the deconvolutional module 165 receives at least one input from the shallow layers and at least one input from the deeper layer, the path through deconvolutional module 165, and the deconvolutional module 167 and eventually the output of the image segmentation controller 121, includes details from the input image before downsampling and after downsampling. Therefore, the final output efficiently combines visual semantic contextual information from lower level and higher level features to produce a high quality output. This generalizes the system and allows the system to produce accurate outputs over images taken at different scales. Thus, the image segmentation controller 121 provides a higher quality and accurate output as a result of the inclusion of the shallow layers before complete downsampling has taken place.

The deconvolutional upsampling in the deconvolutional path provides improvements on simple bilinear upsampling. Simple bilinear interpolation for upsampling tends to degrade the image quality. Deconvolutional layers or convolutional filters which spatially upsample the input image by incorporating image context to them are learned through the training mode. Thus, the deconvolutional layers are dynamic and change over time, as opposed to the bilinear interpolation that has no learnable parameters and is a general simplistic upsampling method.

Figure 6:
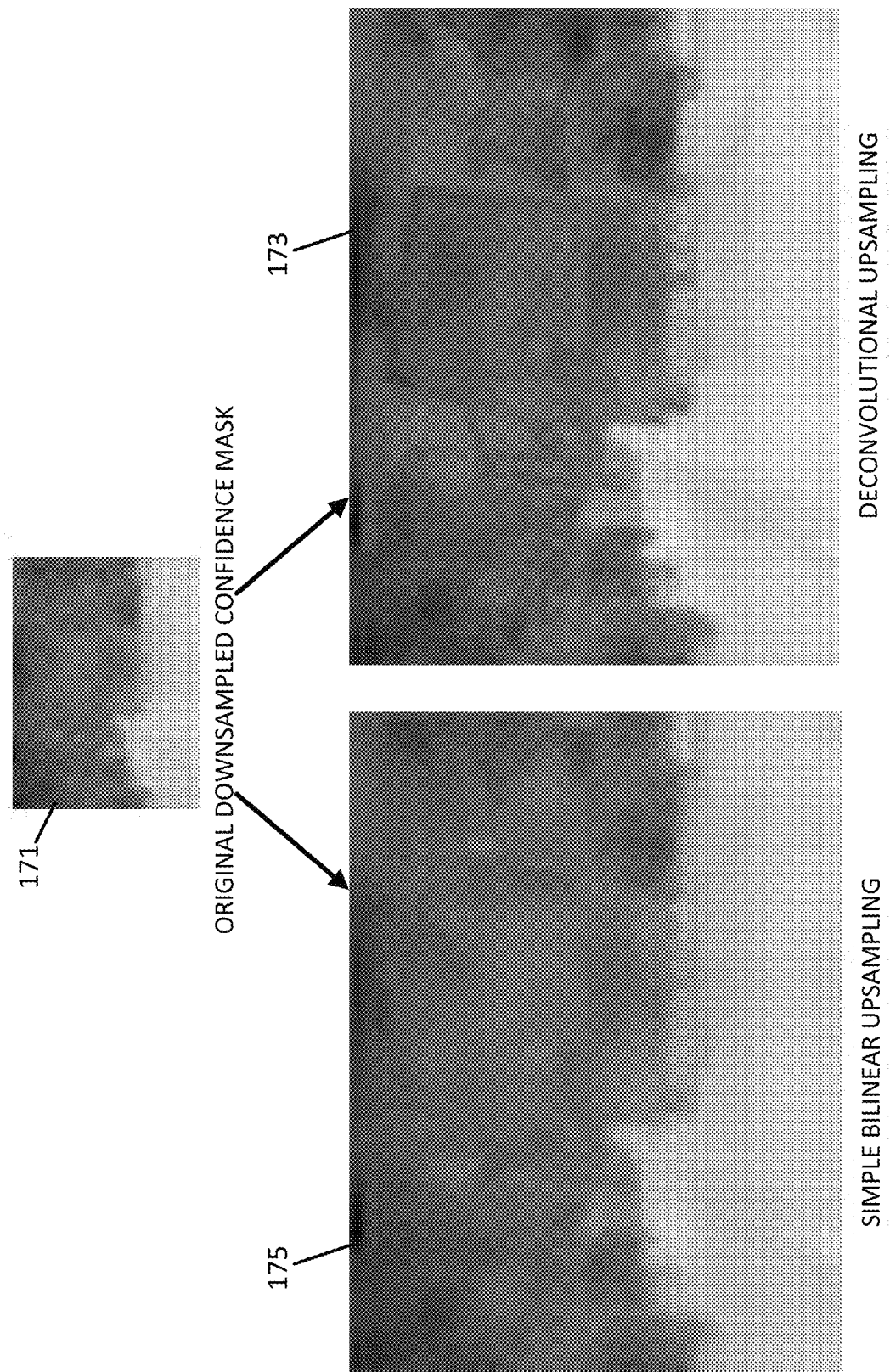
FIG. 6 illustrates a comparison of upsampling techniques.

FIG. 6 illustrates a comparison of the same original downsampled confidence mask 171 as upsampled by the bilinear interpolation for upsampling in image 175 and as upsampled by the deconvolutional upsampling in image 173. As a result of the dynamic deconvolutional layers that change over time, the level of detail in image 173 using the deconvolutional upsampling is greater than the level of detail in the image 175 from the simple bilinear upsampling. A comparison of image 173 and image 175 demonstrates that the image 175 had a higher granularity than the image 173, the image 175 has finer detail than the image 173, and the image 175 is sharper than the image 173.

Figure 7:
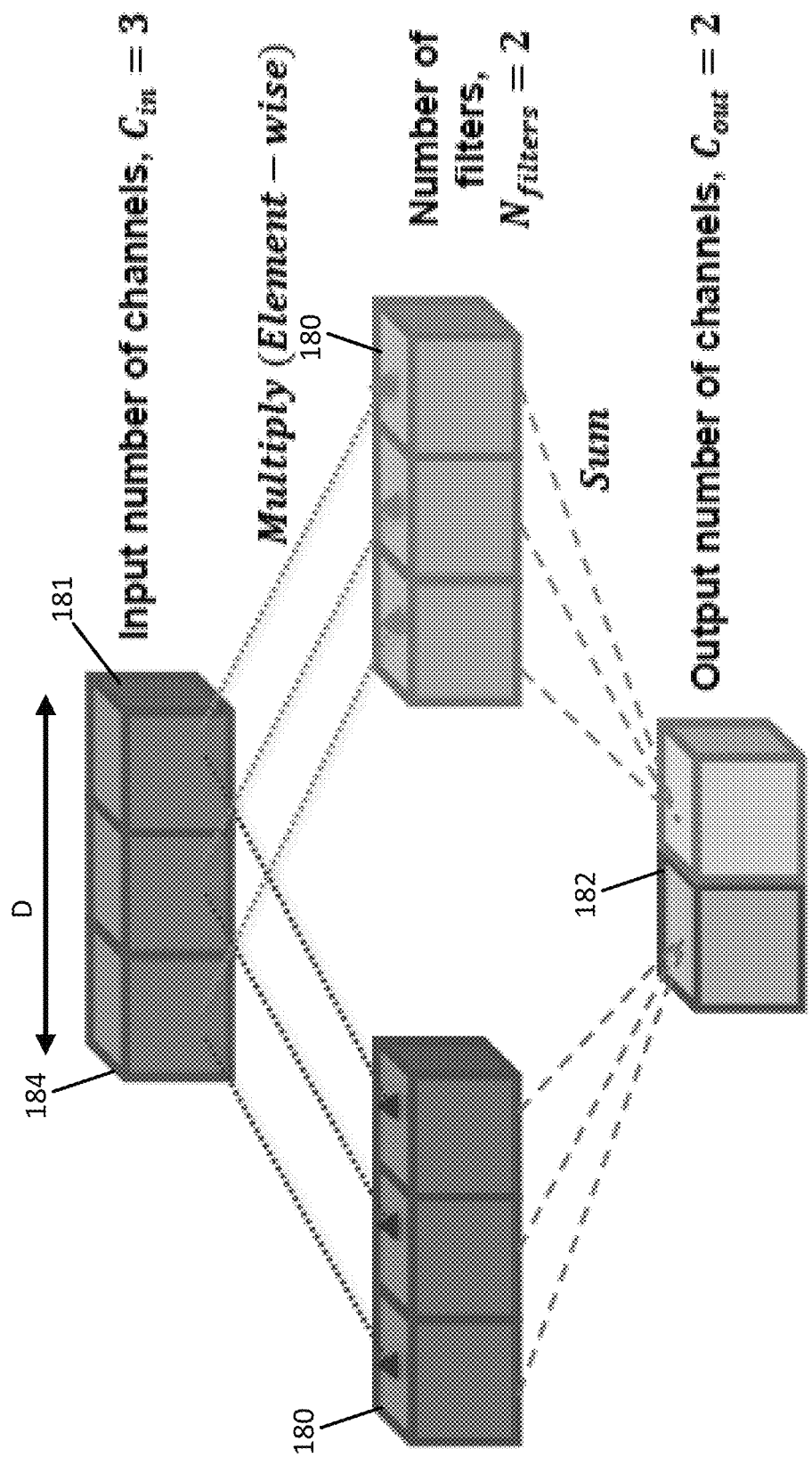
FIG. 7 illustrates dimensions of the feature maps for convolution and deconvolution.

FIG. 7 illustrates dimensions of the feature maps or outputs of the convolution and deconvolution layers or modules. An example dataset for an input image 184 includes a depth D that describes the number of channels. In one example, the number of channels is the number of colors in the image. In another example, the number of channels is the number of possible object classifications or masks. In another example, the number of channels results from the concatenation of feature maps.

One or more filters 180 are applied to the input image 184. The values in the one or more filters 180 are multiplied element wise with the values in the input image 184. The products are summed and become the values in the matrix of the output 182.

As shown in FIG. 7, the output of every convolution/deconvolution operation results in the change of the depth (or channels) of the output volume. The deconvolution layers successively increase the spatial dimensions while reducing the depthwise dimensions. The names corresponding to each block may be given the following naming convention: <LayerName>_<FilterWidth>×<FilterHeight>_<InputChannels (Cin)>×<OutputChannels (Cout). Therefore, the layer with name "deconv0_3×3_512×128" has a filter height and width of 3, accepts an input volume of 512 channels (depth of 512) and outputs a volume of 128 channels. The depthwise dimension has reduced from 512 to 128.

Dimensions mentioned may follow the format WIDTH×HEIGHT×CHANNELS. For example, tor an input image of dimensions 960×720×3, the input to deconvolutional module 163 has dimensions 120×90×512 and the output of deconvolutional module 163 has a dimension of 240×180×128. Notice that the width and height have increased while the channels have reduced. This trend continued through deconvolutional module 165 and deconvolutional module 167 such that by the end of deconvolutional module 176, the output has dimensions 960×720×64 for an input with dimensions 960×720×3. Hence, deconvolutional module 167 upsamples back to the original spatial resolution.

FIGS. 8-12 illustrate long range residual connections. The deconvolutional layers (e.g., deconvolutional module 163, deconvolutional module 165, and deconvolutional module 167) utilize contextual and semantic information from the image at multiple levels. The motivation for this follows from the fact that the layers at the beginning extract low-level features (e.g., edges, corners, and other simple shapes) and the features gradually keep getting semantically richer with depth (layers towards the end capture high-level features (e.g., squares, wheels, circles, regions, and other complex shapes).

Figure 8:
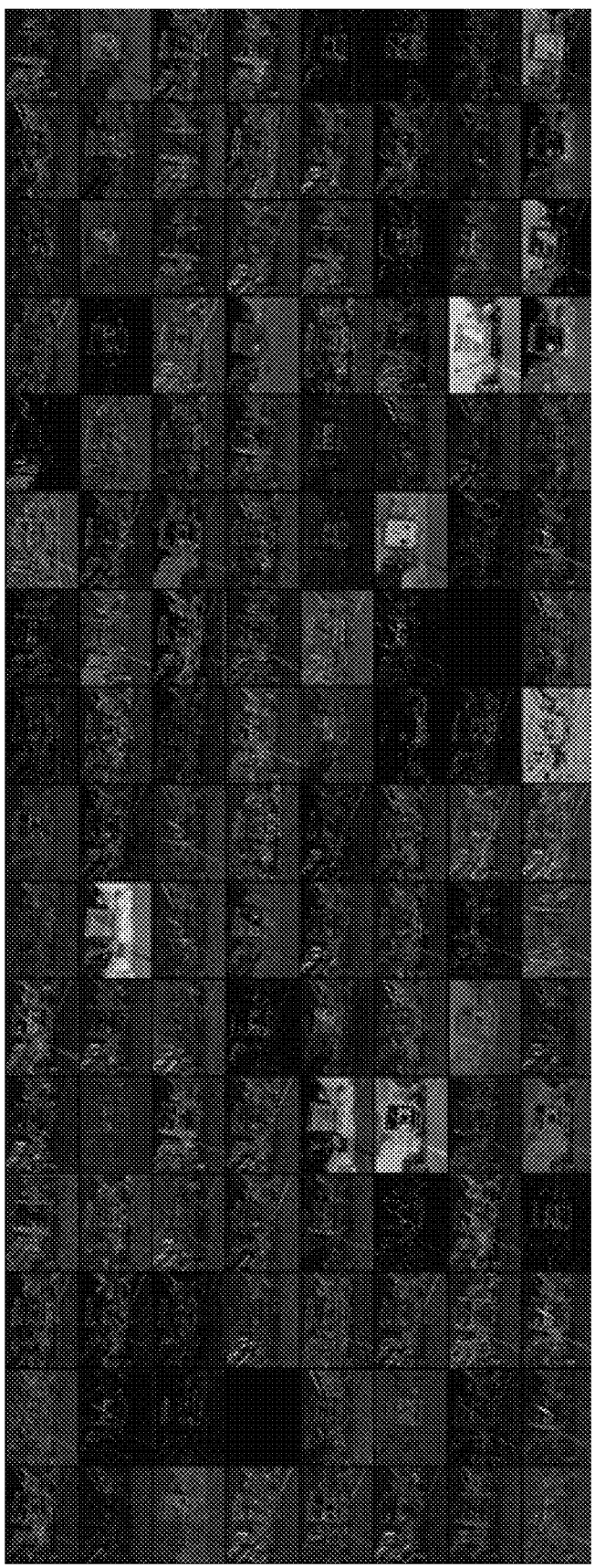
FIG. 8 illustrates feature maps at a pooling module of the image segmentation controller.

FIG. 8 illustrates an example output or feature map for the pooling module 153. The example output or feature map includes the following parameters: input_channels=64, output_channels=128 (128 feature maps shown in FIG. 8).

Figure 9:
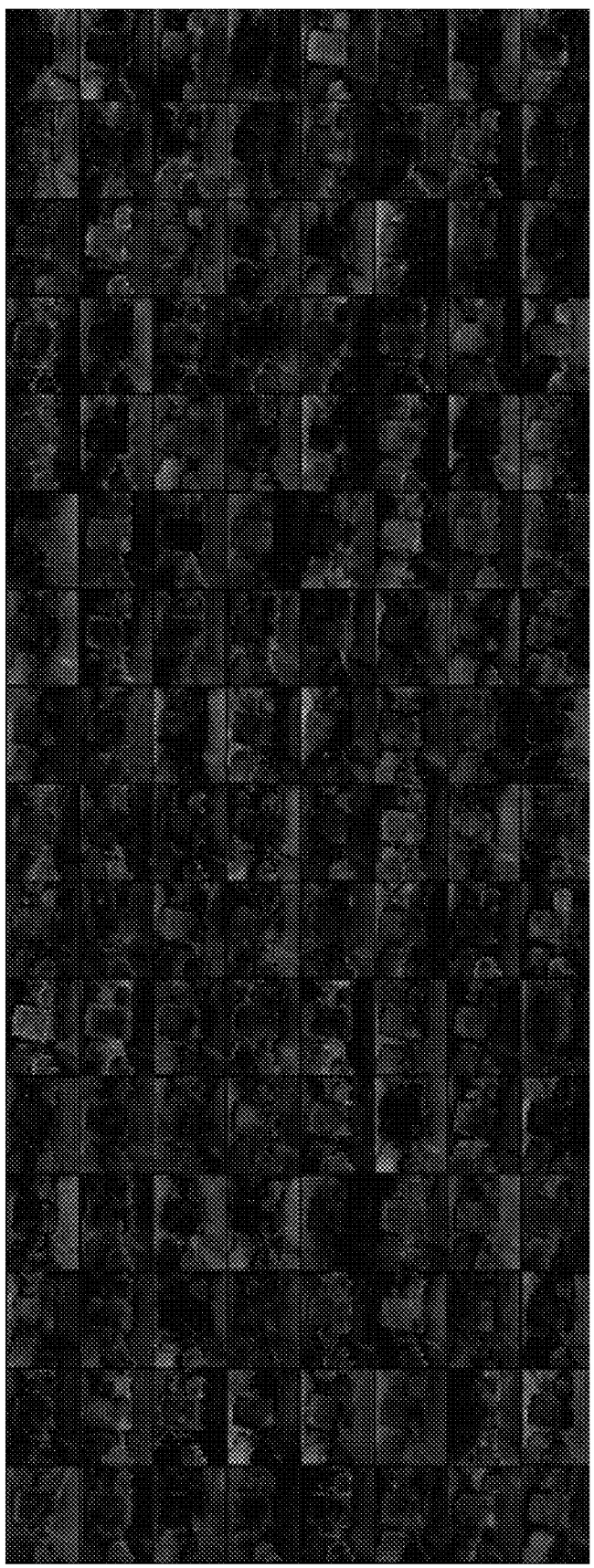
FIG. 9 illustrates features at a deconvolution module of the image segmentation controller.

FIG. 9 illustrates an example output or feature map for the deconvolutional module 163. The example output or feature map includes the following parameters: input_channels=512, output_channels=128 (128 feature maps shown in FIG. 9).

FIGS. 8 and 9 illustrates that the shallow layer (output of pooling module 153) is more responsive to basic, low-level features like edges, and other simple shapes whereas the deep layer (output of deconvolutional module 163) is more responsive to high-level features corresponding to image regions rather than simply edges.

The two sets of feature maps shown in FIGS. 8 and 9 are then input in to deconvolutional module 165 after being concatenated. This way, the image segmentation controller 121 combines both low-level and high-level contextual information while learning the deconvolutional filters for upsampling.

Figure 10:
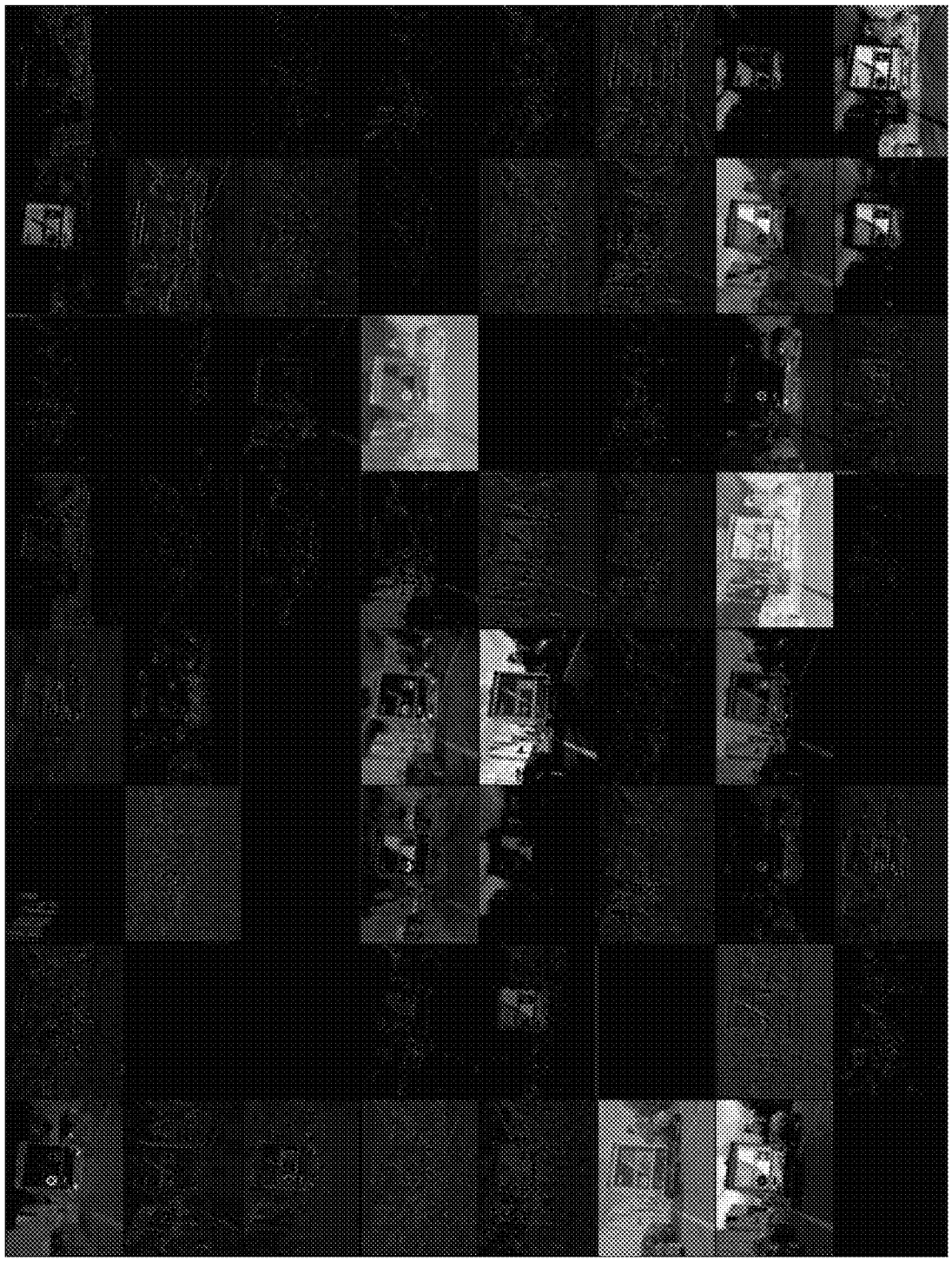
FIG. 10 illustrates feature maps for a deconvolutional module of the image segmentation controller.

FIG. 10 illustrates an example output or feature map for the deconvolutional module 165. The example output or feature map includes the following parameters: input_channels=256, output_channels=64 (64 feature maps shown in FIG. 10). FIG. 10 portrays a richer feature map (captures higher level features) which also shows that feature-richness increases with depth. This is further combined with the output from the shallow layer of initial convolutional module 151 and fed in to deconvolutional module 167.

Figure 11:
FIG. 11 illustrates feature maps for a convolutional module of the image segmentation controller.
Figure 12:
FIG. 12 illustrates feature maps for another deconvolutional module of the image segmentation controller.

FIG. 11 illustrates an example output or feature map from the initial convolutional module 151. The example output or feature map includes the following parameters: input_channels=64, output_channels=64 (64 feature maps shown in FIG. 11). FIG. 12 illustrates an example output or feature map from deconvolutional module 167. The example output or feature map includes the following parameters: input_channels=128, output_channels=64 (64 feature maps shown in FIG. 12).

Figure 13A:
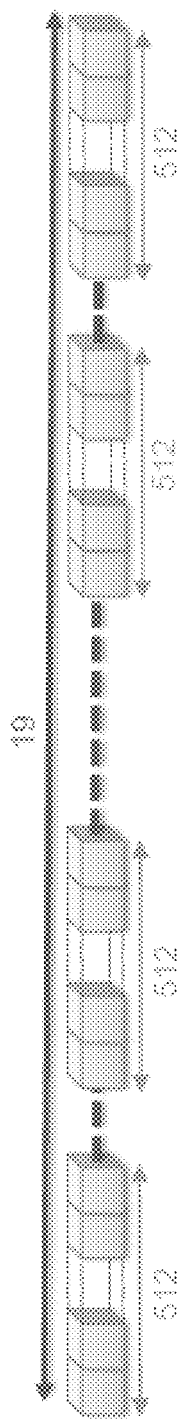
FIG. 13A illustrates weights for an example convolutional module.

FIG. 13A illustrates weights for convolutional module 159. The weights of convolutional module 161 may be selected from the pre-learned weights from convolutional module 159. The convolutional module 161 accepts an input volume with a depth of 512 channels and outputs a volume with 19 channels and the filter has a height and width of 1. Thus, the dimensions of the filters of convolutional module 158 is 1×1×512×19, which means that there are 19 filters, each having 512 depth and spatial dimensions of 1×1. FIG. 13A illustrates 19 1-dimensional arrays where each array has a length of 512.

Figure 13B:
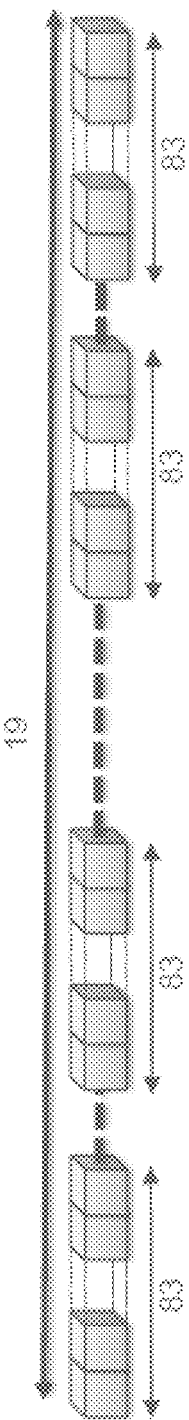
FIG. 13B illustrates weights for an example convolutional module.

FIG. 13B illustrates weights for convolutional module 161. The weights for deconvolutional module 161 have the dimensions 1×1×83×19. This means that these are 19 1-dimensional arrays with each array having a length of 83. The depth of each filter is 83 because it accepts inputs from the layer deconvolutional module 167 which has an output depth of 64 concatenated with the output from layer convolutional module 159 having an output depth of 19. Thus, from 64+19=83, the depth of the filter is 83.

Figure 14:
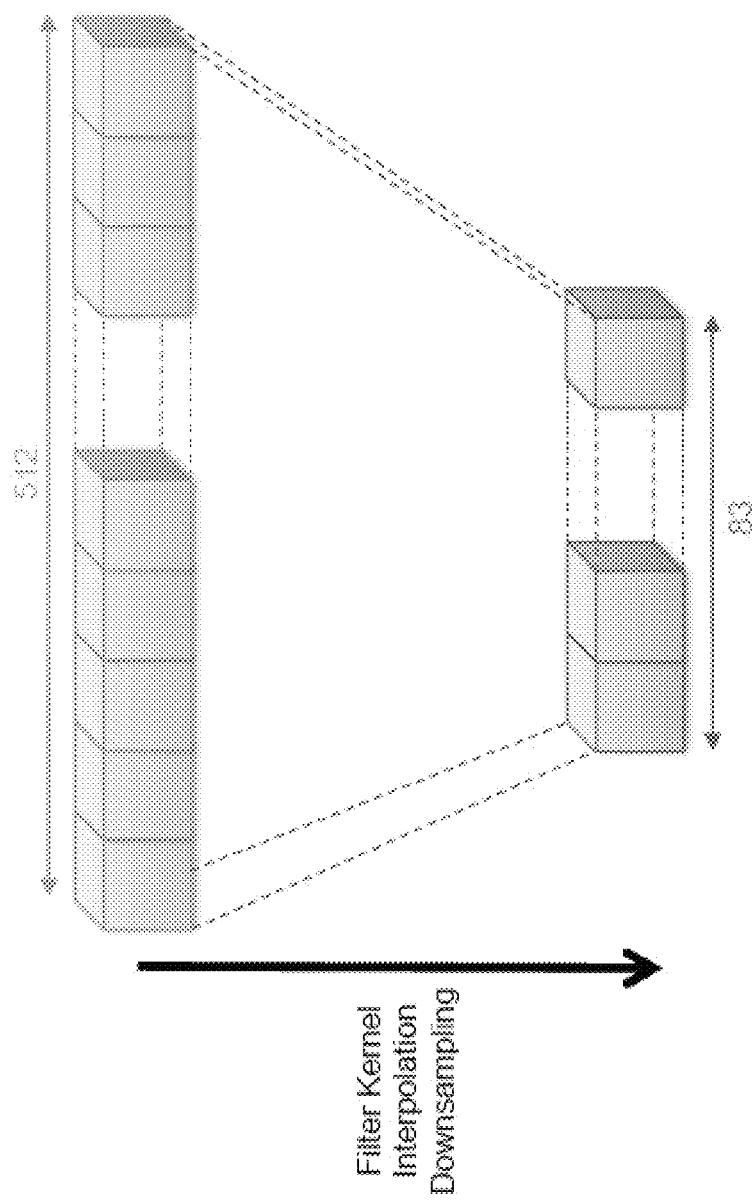
FIG. 14 illustrates an interpolation for determining filter weights.

FIG. 14 illustrates an interpolation for determining filter weights. One or more example embodiments described interpolate the values (e.g., kernel or weights of the kernel) of filters from one layer or module to calculate values (e.g., kernel or weights of the kernel) of filters of another layer or module. In some example embodiments both the values of the filters and the feature maps or outputs of the modules are interpolated. The input to a layer or module is convolved with the filter values to obtain the feature map. FIG. 14 illustrates filter kernel interpolation.

To utilize the learned weights from layer convolutional module 159, the image segmentation controller 121 interpolates each filter (having depth of 512 in convolutional module 159) to a new filter with depth 83 for convolutional module 161. In other words, the image segmentation controller 121 downsamples each filter to match the filter dimensions in convolutional module 161, before commencing training. The interpolation may be done using the bilinear interpolation algorithm overvalues of the previous layer for the next layer. For example, when N values are included in the first layer and M values are included in the second layer, each N/M set of values from the first layer are interpolated to calculate values for the second layer.

As a result, a much better initialization point is calculated, which ultimately needs much lesser training steps to converge than the case where the new weights are randomly initialized.

Figure 15:
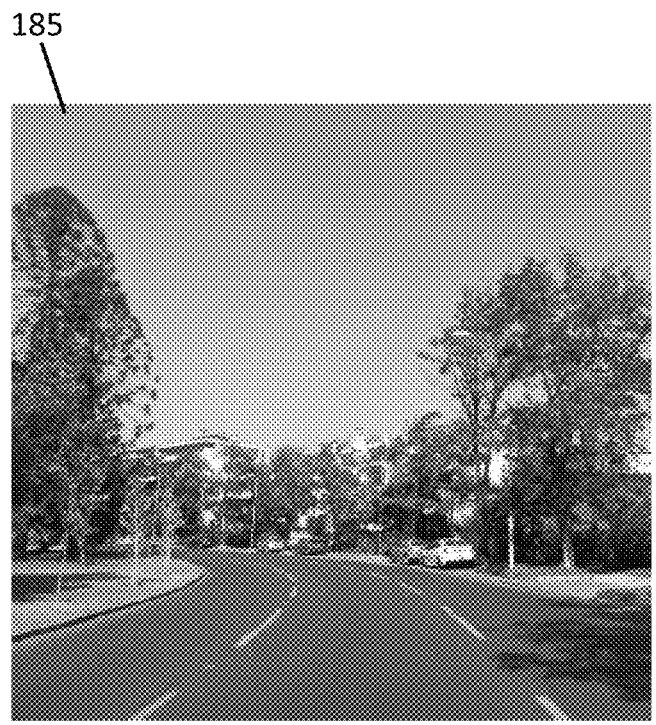
FIG. 15 illustrates an improvement using the filter interpolation technique.
Figure 15:
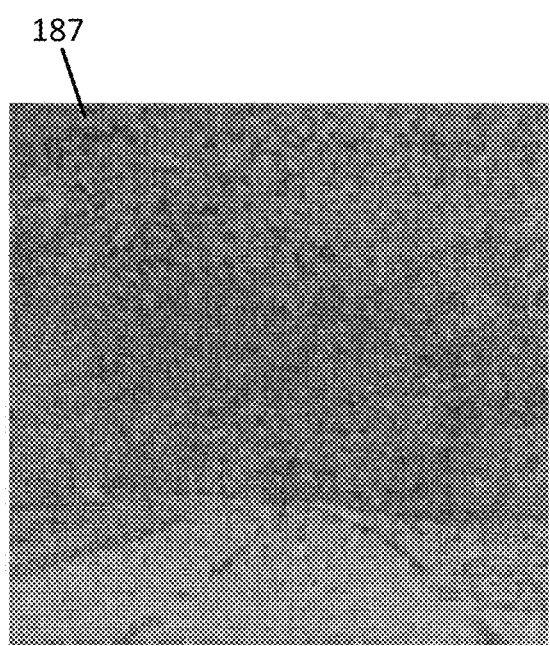
Figure 15:

FIG. 15 illustrates an improvement using the filter interpolation technique for the input image 185. Image 187 and image 189 illustrate example initial segmentation outputs without any training. In other words, the image 187 and image 189 are outputs of the image segmentation controller 121 in the inference mode without initially operating the training mode. Image 187 is the output using randomly initialized weights, and image 189 is the output using the interpolation technique such that weights from at least one layer or module in the image segmentation controller 121 is determined from weights from at least one other layer or module in the image segmentation controller 121. In one example, the weights from convolutional module 159 at a first quantity is interpolated to a second quantity and applied to the initial weights in convolutional module 161. A comparison of image 187 and image 189 reveals that a higher resolution output, a better estimation of image segmentation, and a sharper boundary between segments.

Figure 16:
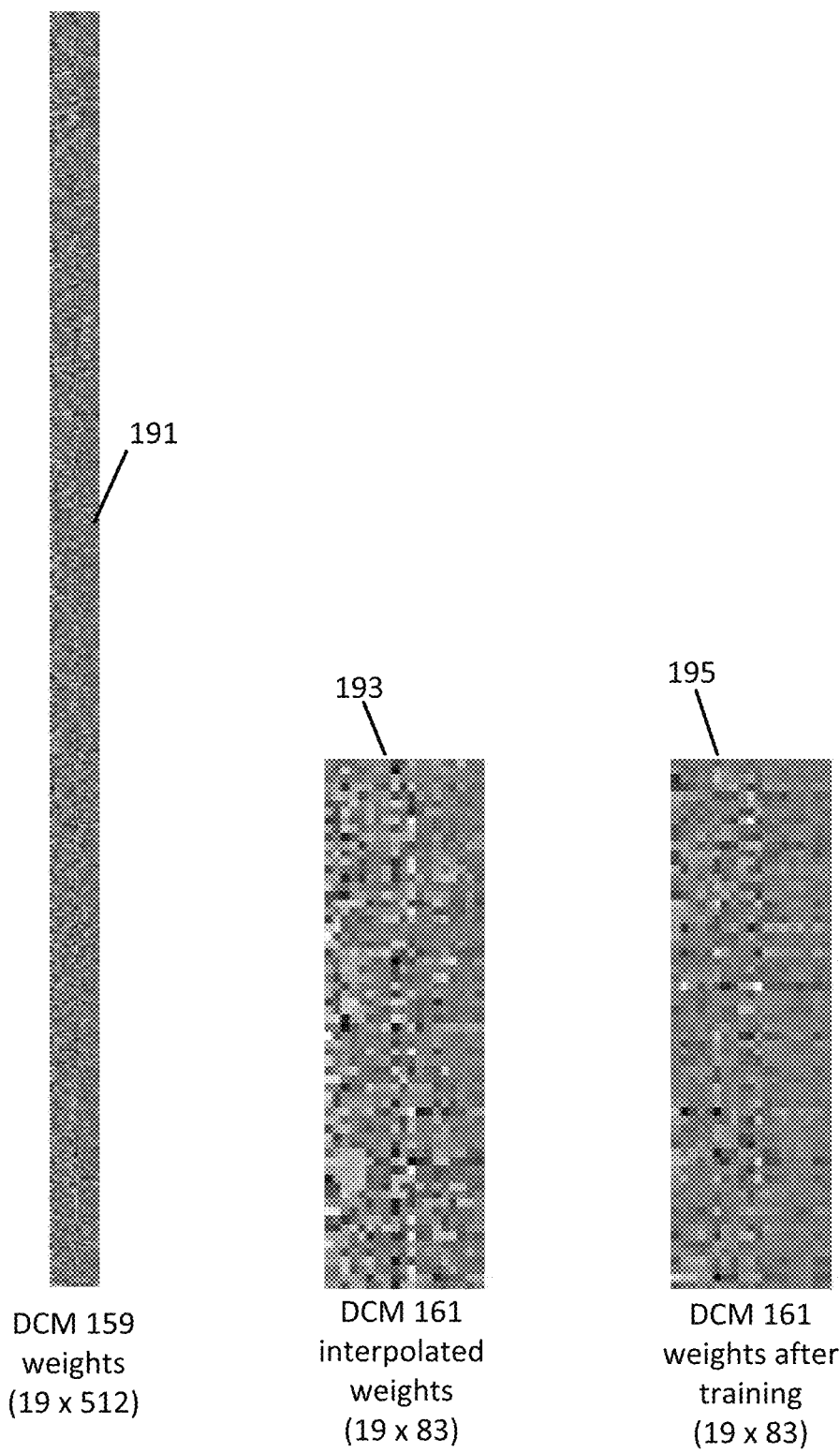
FIG. 16 illustrates graphical representations of the filters of one or more convolutional layers.

FIG. 16 illustrates graphical representations of the filters of one or more convolutional layers. Filter representation 191 represents the filter weights for convolutional module 159. Filter representation 193 represents the filter weights for convolutional module 161 that are applied initially through interpolation. Filter representation 195 represents the filter weights for deconvolutional module 161 that are applied starting from random initialization weights after at least some of the training mode has been performed. A comparison of filter representation 193 and filter representation 195 indicates that the interpolated filter weights are similar to that which is obtained after training. Randomly selected initialization points would be much different than filter representation 193 and filter representation 195, suggesting the improvements realized from selecting the initial weights from other layers and interpolation.

The training convolution module 169 and the inference convolution module 171 may include one or more additional convolutions to reduce the noise of the output. During the training mode, the training convolution module 169 may include a smoothing filter, which may have 1×1 dimensions. While training, the filters of the training convolution module 169 have spatial dimensions of 1×1 and the input to this layer has the same spatial dimensions which is output from the convolutional module 161.

Figure 17A:
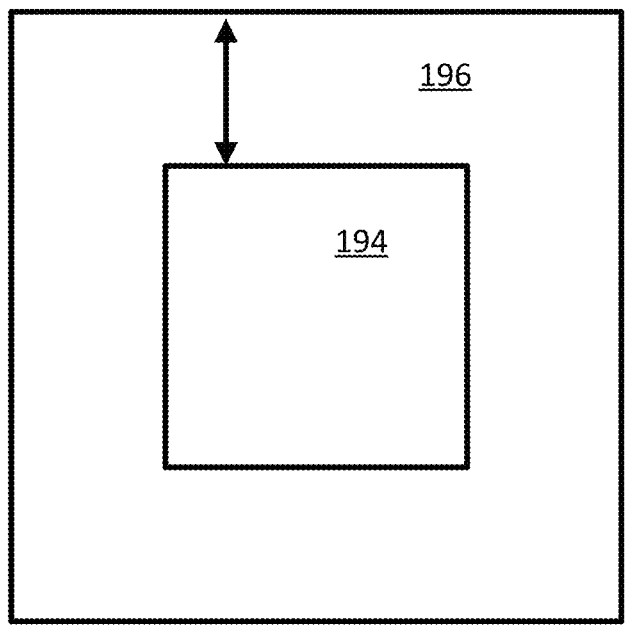
FIG. 17A illustrates an example spatial upsampling.

The inference convolutional module 171 may include three modifications. First, inference convolutional module 171 spatially upsamples the output from the convolutional module 161 using bilinear interpolation to increase each spatial dimension by 2. FIG. 17A illustrates an example spatial upsampling from the dimensions 194 of the output of the convolutional module 161 to the increased dimension 196.

If D denotes the length of side of the output volume after convolving an input having side length W with a convolution kernel with a receptive field size (kernel side length) of F with a stride of S and with padding P, the relation between these values is given by Equation 1:

$$D = \frac{W - F + 2P}{S} + 1$$

In one example, F=3, P=0, S=1, results in the following relation D=W−3+1 ⇒W=D+2. From this relationship, the input to inference convolutional module 171 is selected to be upsampled by 2 to preserve the same spatial dimension. The benefits of this step is most pronounced in the segmentation of far-off objects which appear really small in the image.

Figure 17B:
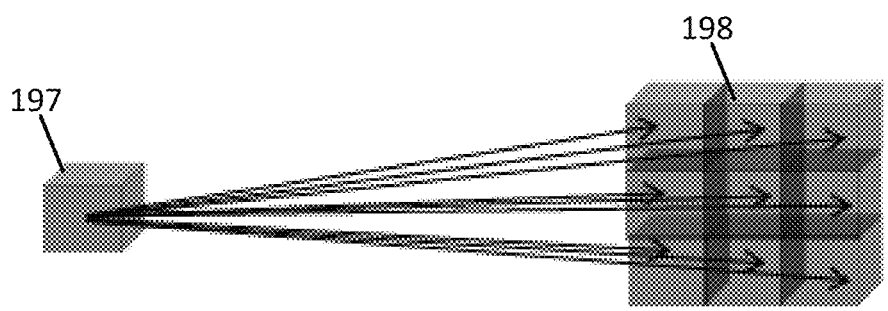
FIG. 17B illustrates an example filter upsampling.

Second, the 1×1 filters learnt for training convolutional module 169 during training phase are reproduced, inflated or "blown up" to a higher dimension such as 3×3 by repeating them to form the new kernels. FIG. 17B illustrates an example filter upsampling such that each value in the original kernel or filter 197 is repeated to generate the new kernel or filter 198. The image segmentation controller 121 is configured to expand dimensions of filter 197 to define filter 198 for performing a final stage convolution using the expanded dimensions of the filter from the fifth stage.

Third, the upsampled output from convolutional module 161 is convolved with the new blown up 3×3 filters 198 obtained in the second step to get a cleaner segmentation output.

Figure 18:
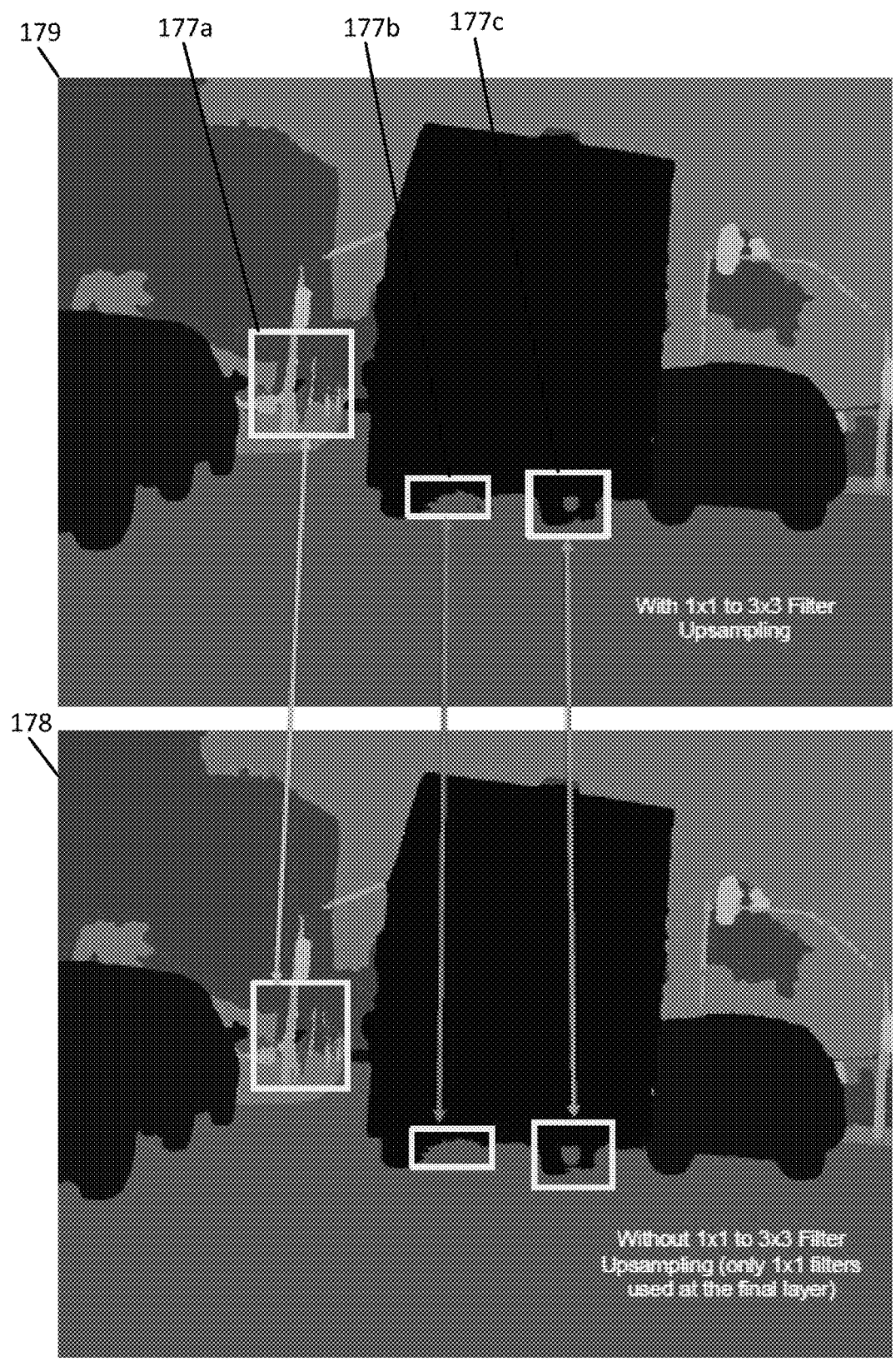
FIG. 18 illustrates a comparison of output images.

FIG. 18 illustrates a comparison of output images including a prior technique image 178. As can be seen the granularity of the image is substantially improved in the case with the filter upsampling (the upper image). The three main image regions (street corner region 177a, left truck tire region 177b, and right truck tire region 177c) where this is most pronounced start with the person in the far-off background near the pole-like object to the left of the image at region 177a. In the prior technique image 178, (without filter-upsampling) the segmentation in this region appears spotty and noisy with multiple pixels in the proximity being erroneously classified as a 'pole'. This mainly due to the fact that image regions tend to lose contextual information with increasing distance. The image segmentation technique described herein, as illustrated by image 179, smoothens this and rectifies the noise by removing the noisy and misclassified pixels and replacing them with correctly classified pixels (building). The second region 177b appears to the right of the truck's left tire. The boundary of the truck is rugged in the prior technique image 178 is also smoother in the image 179 obtained using the filter upsampling technique. The third region 177c is on the right rear tire of the truck which appears to have a large hole in the prior technique image 178. This hole can be credited to the presence of mud-guards on the rear wheels which tends to be mischaracterized by the image segmentation as a 'road' due to similar colors and textures. However, the size of this hole is substantially reduced in the image 179 obtained using filter kernel interpolation. Furthermore, image 179 illustrates that the image segmentation controller 121 identified most parts of the mud-guard as a part of the truck despite similar colors and textures as the road. This is another explication of the fact that the image segmentation controller 121 combines visual contextual information at different abstraction levels to produce a high-quality output.

The image segmentation controller 121 may also implement a watershed algorithm aided segmentation to the output or during post-processing. After obtaining the raw segmentation outputs from the neural network, the segmentation outputs may be enhanced by a post-processing step consisting of various stages including mask cleaning and watershed segmentation.

In mask cleaning, the masks obtained directly from the neural network sometimes tend to have noise in the form of spots (false positives). These false positives are filtered out by performing an area-based thresholding. In this step, small regions of erroneous detections are removed by checking if the pixelwise area of the regions are lesser than a set threshold. To keep this step agnostic to the size of the input image, the thresholds are expressed in term of fraction of image coverage.

Also, the thresholds for each semantic class is chosen separately. This is because the size of the false positive is vaguely related to the corresponding class to which the false positive belongs to. For example, since sidewalks (or roads) usually occupy a large part of the image, any region labelled as this class should typically have a large area—hence, the area fraction threshold for filtering false positive for this label should be high; however, traffic lights are relatively much smaller—hence, their area threshold should be set low as the true positive regions themselves tend to occupy much small regions in the image so, setting a high area filtering threshold will cause the model to miss out the detections.

In watershed segmentation, the image segmentation controller 121 performs an unsupervised segmentation algorithm which starts with a known region confirmed to be 'foreground' (belonging to the semantic class), a known 'background' (not belonging to the semantic class) and an 'unsure' region which the algorithm segments by using information from the previous two regions in to 'foreground' and 'background'. The image segmentation controller 121 analyzes each segmentation mask from the output and applies watershed segmentation using the original image to get tighter contours. The idea behind this watershed algorithm identifies similar patterns in the image regions corresponding to the initial 'foreground' masks and basically bleed out the initial regions to cover the areas with similar patterns until the borders of the object under it.

Figure 19:
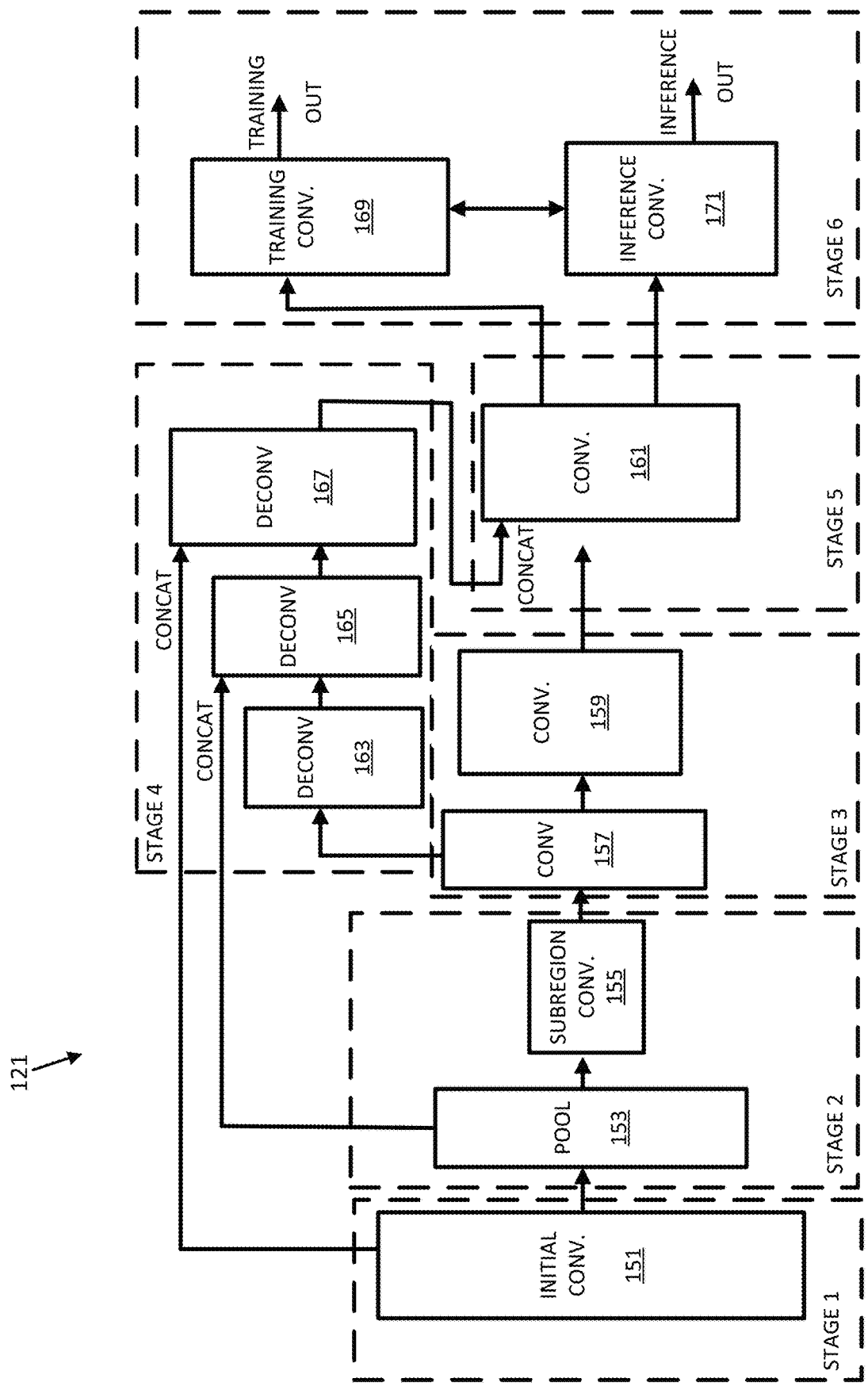
FIG. 19 illustrates another example image segmentation controller.

FIG. 19 illustrates another example image segmentation controller 121. The descriptions herein of the components of the image segmentation controller 121 applied to this example, and designations are included to describe modification and flexibility in the architecture. FIG. 19 illustrates stages (e.g., Stage 1, Stage 2, Stage 3, Stage 4, Stage 5, and Stage 6). The deep neural network pipeline includes a multiple paths including a first prong from the Stage 11 to Stage 4 for low level features and shallow layers, a second prong from the Stage 1 through Stage 2, Stage 3, and Stage 4 for upsampling, and a third prong from the Stage 1 through the Stage 2, Stage 3, and Stage 4 for pyramidal pooling. It is understood that the stages may be defined in other arrangements. As illustrated Stage 1 includes the initial convolutional module 151, Stage 2 includes the pooling convolutional module 153 and the subregion convolutional module 155, Stage 3 includes the convolutional module 157 and the convolutional module 159, Stage 4 includes the deconvolutional layers include deconvolutional module 163, deconvolutional module 165, and deconvolutional module 165, Stage 5 includes the convolutional module 161, and Stage 6 includes the output layers including the training convolutional module 169 and the inference convolutional module 171.

Figure 20:
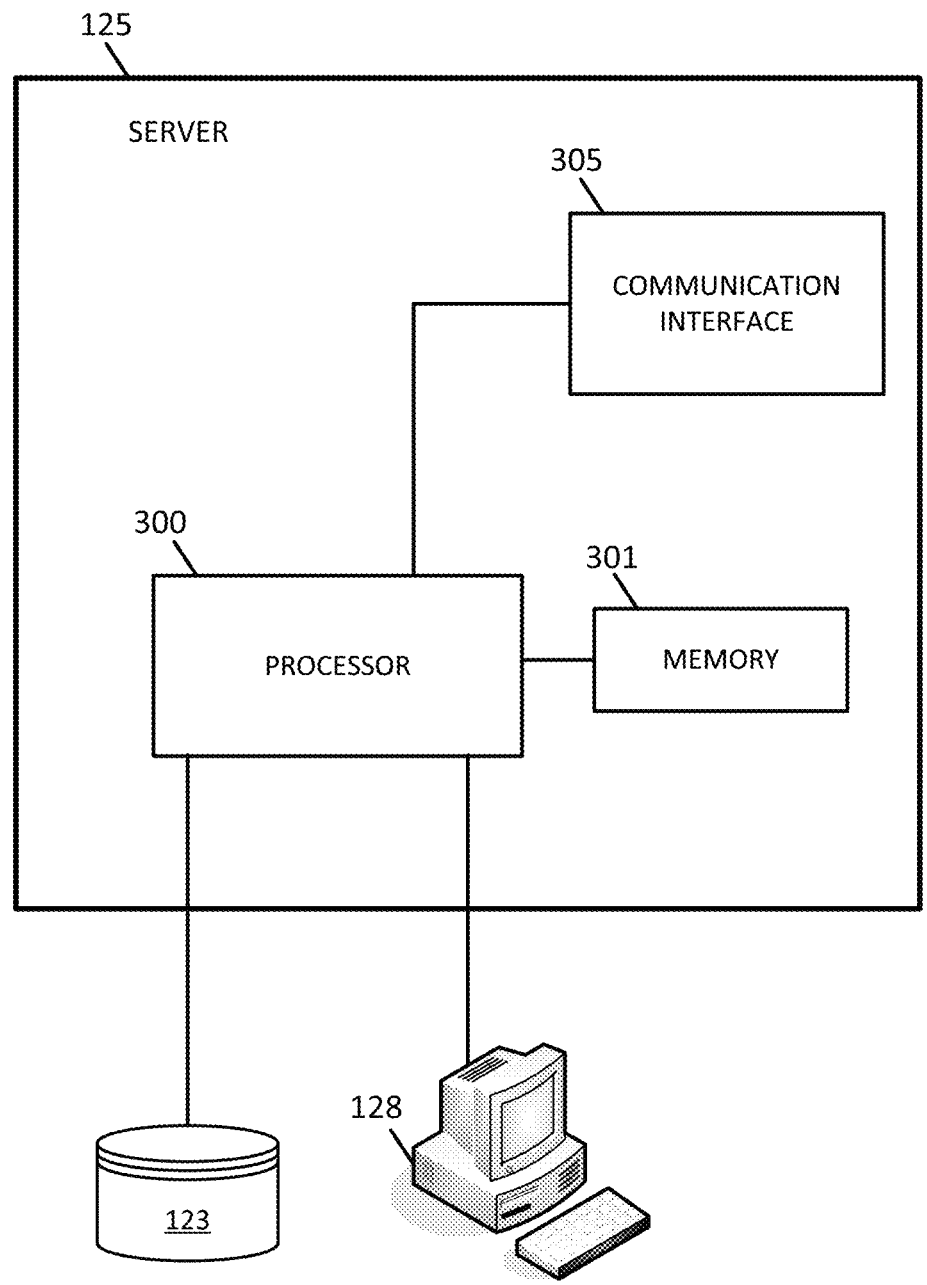
FIG. 20 illustrates an example server implementation of the image segmentation controller.

FIG. 20 illustrates an example server implementation of the image segmentation controller. FIG. 20 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. The settings may include settings for thresholds and other user preferences described herein. Additional, different, or fewer components may be provided in the server 125.

Figure 21:
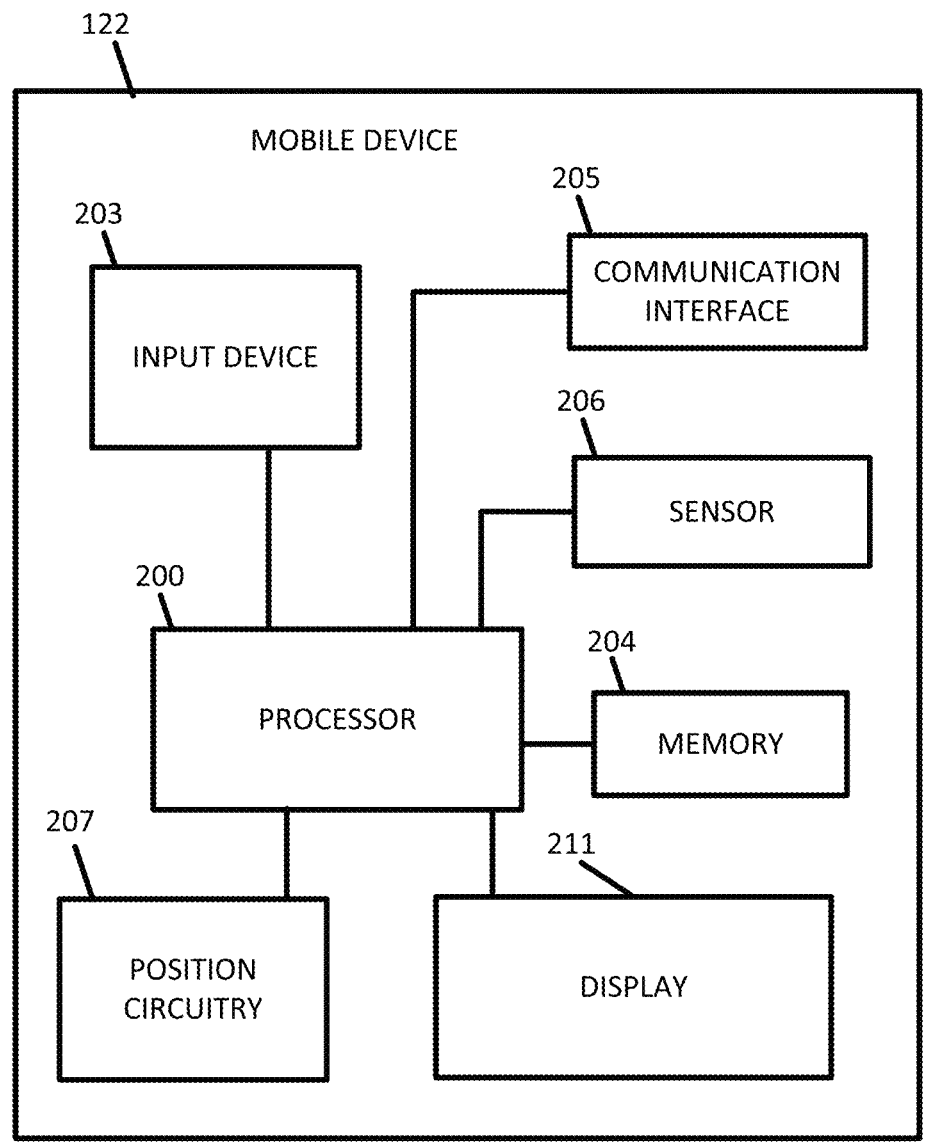
FIG. 21 illustrates an example mobile device implementation of the image segmentation controller.

FIG. 21 illustrates an example mobile device implementation of the image segmentation controller. FIG. 21 illustrates an exemplary mobile device 122 of the system of FIG. 1. The mobile device 122 includes a processor 200, a memory 204, an input device 203, a communication interface 205, position circuitry 207, a display 211, and a sensor 206. The sensor 206 may include a camera or another imaging device. The sensor 206 may include LiDAR or another distance based point cloud device. The input device 203 may receive commands from the user for default settings for the classification techniques. The default settings may include the number of object classifications, the identifiers of the classifications, the number of convolutional layers, or the number of deconvolutional layers.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 22:
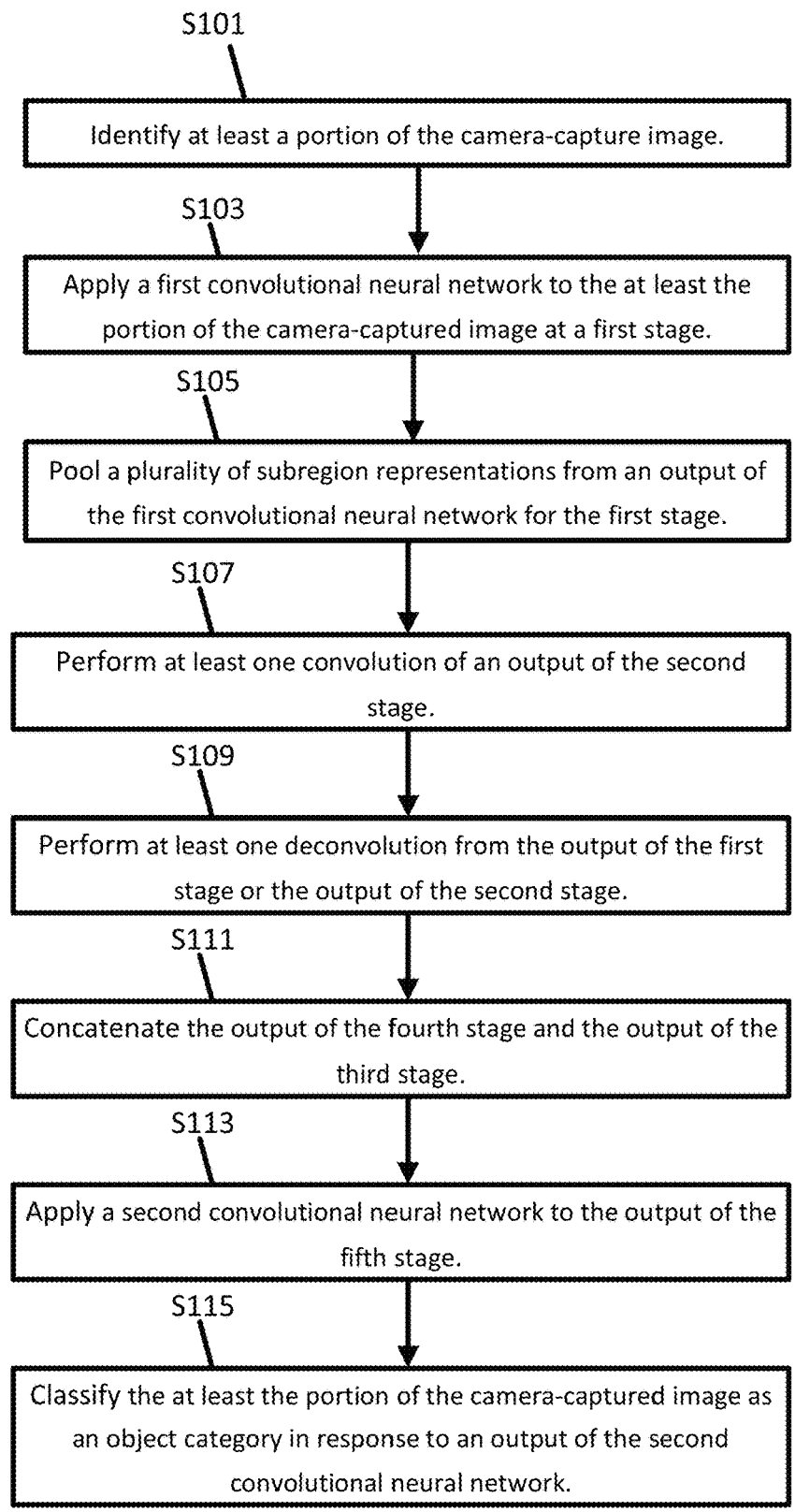
FIG. 22 illustrates an example flow chart for the operations of the server and/or the mobile device.

FIG. 22 illustrates an example flow chart for the operations of the server and/or the mobile device. Additional, different, or fewer acts may be provided. Either the mobile device 122 or the server 125 performs the acts of FIG. 22. The resulting object classifications may be provided back to the mobile device 122 or other mobile devices 122 for the location based service.

At act S101, the processor 200 or the processor 300 ("processor") performs identifying at least a portion of a camera-captured image collected by the sensor 206. Alternatively, the image may be collected by another device such as LiDAR. The processor may extract pixel values from the image or the portion of the image.

The processor 200 or the processor 300 may include an image identification module including an application specific module or processor that identifies at least a portion of a camera-captured image collected by the sensor 206. The processor is an example means for identifying at least a portion of a camera-captured image. The sensor 206 (e.g., camera) is an example means for collecting the image.

At act S103, the processor 200 or the processor 300 applies a first convolution or convolutional neural network to the at least the portion of the camera-captured image at a first stage such as Stage 1 including the initial convolutional module 151. Stage 1 is illustrated including convolutional module 151 but may include additional modules or layers. The pixel values extracted from the image are convolved with a filter for the first convolution to generate a feature map.

The processor 200 or the processor 300 may include a first convolution module including an application specific module or processor that applies a first convolution or convolutional neural network to the at least the portion of the camera-captured image. The initial convolutional module 151 is an example means for applying a first convolution or convolutional neural network to the at least the portion of the camera-captured image.

At act S105, the processor 200 or the processor 300 pools, at Stage 2, multiple subregion representations from an output of Stage 1. Stage 2 may include one or more convolutional modules. The values of the feature maps from Stage 1 are convolved with a filter from Stage 2 to generate another feature map. Stage 2 is illustrated including pooling convolutional module 153 and subregion convolutional module 155 but additional or modules or layers may be included in Stage 2. The output of Stage 2 is provided to Stage 3 and Stage 4.

The multiple subregion representations may include different sizes of subregions. The multiple subregion representations may include produce different levels of coarseness in the result. The processor may determine a large image block at a first level of coarseness and determine a small image block at a second level of coarseness. The set of subregion representations may include a pyramid of blocks having varying objects or varying detail levels.

The processor 200 or the processor 300 may include a pooling module including an application specific module or processor that pools multiple subregion representations. The initial convolutional module 151 is an example means for pooling the multiple subregion representations.

At act S107, the processor 200 or the processor 300 may perform at least one convolution of an output of Stage 2 at Stage 3. Stage 3 may include one or more convolutional modules. The values of the feature maps from Stage 3 are convolved with a filter from Stage 3 to generate another feature map. The output of Stage 3 is provided to Stage 4 and Stage 5.

The weights of some of the filters of Stage 3 may be initialized using weights from other filters in of Stage 3. The processor is configured perform a first third stage convolution (e.g., at convolutional module 157) including a set of weights and perform a second third stage convolution (e.g., convolutional module 159) from an output of the first third stage convolution and initialized using the set of weights from the first third stage convolution and defined before the second third stage convolution is performed.

The processor 200 or the processor 300 may include a second convolution module including an application specific module or processor that applies the convolution on the output of Stage 2. The convolutional module 157 and convolutional module 159 are example means for applying the second convolution.

At act S109, the processor 200 or the processor 300 may perform, at Stage 4, at least one deconvolution from the output of Stage 1 or the output of Stage 2. Stage 4 may include one or more deconvolutional modules such as deconvolutional module 163, deconvolutional module 165, and deconvolutional module 167. The values of the feature maps received at the deconvolutional modules are deconvolved by applying an inverse filter from Stage 4. Before applying the inverse filter at each layer, the processor may augment or modify the image (i.e., augment or modify the feature map or output received as an input to the current layer). For example, the processor may insert padding values in between at least one row or at least one column in the feature map. In the case of deconvolutional module 167, the processor is configured to insert padding values in the output of Stage 1. In the case of deconvolutional module 165, the processor is configured to insert padding values in the output of Stage 2. In the case of deconvolutional module 163, the processor is configured to insert padding values in the output of Stage 3. The padding values may be predetermined values such as 0 or 255 or another integer. The padding values and the output of Stage 1, Stage 2, and/or Stage 3 are applied to the at least one deconvolution.

This process may be repeated at multiple layers such as at deconvolutional module 163, deconvolutional module 165, and deconvolutional module 167. That is, each of the layers may include an inverse filter that is convolved with the output of the previous layer and concatenated with one or more features maps from one of the convolutional layers, as illustrated by Stages 1, 2, and 3. The output of Stage 4 is provided to Stage 5.

The input at one or more of the deconvolution modules may include the output or feature map from a previously deconvolutional module concatenated with an output or feature map from an earlier convolutional layer. For example, deconvolutional module 165 performs a first deconvolution provided with inputs from the output of Stage 1 concatenated with the feature map from deconvolutional module 163, and deconvolutional module 167 performs a second deconvolution provided with inputs from the output of Stage 2 concatenated with the feature map from deconvolutional module 165. Before the first deconvolution at deconvolutional module 165, the deconvolutional module 163 performs an initial deconvolution from the output of Stage 3. Thus, in some examples, Stage 4 provides multiple deconvolutions based on multiple inverse filters and the outputs of Stage 1, Stage 2, and Stage 3.

The processor 200 or the processor 300 may include a deconvolution module including an application specific module or processor that applies one or more deconvolutions. The deconvolutional module 163, deconvolutional module 165, and deconvolutional module 167 are example means for applying deconvolution.

At act S111, the processor 200 or the processor 300 performs a convolution at Stage 5 based on the output of the deconvolutions from Stage 4. The processor may concatenate the output or feature map from Stage 3 (e.g., convolutional module 159) with the output or feature map from Stage 4 (e.g., deconvolutional module 167). The concatenated values of the feature maps from Stage 4 and Stage 3 are convolved with a filter to generate another feature map.

The processor 200 or the processor 300 may include a third convolution module including an application specific module or processor that applies a convolution to the output of the deconvolution layers. The convolutional module 161 is an example means for applying the third convolution.

At act S113, the processor 200 or the processor 300, at Stage 6, applies another convolution the feature map of Stage 5. The processor may perform a final convolutional or filtering operation on the output of Stage 5. At a training portion (e.g., training convolutional module 169), the final convolutional operate may smooth out artifacts in the image for example, using a training filter 1×1 filter. At the inference portion (e.g., inference convolutional module 171), the processor applies an inference filter in the final convolutional operation. The inference filter may be generator from the training filter. The values or single value of the training filter may be repeated in the inference filter according to the dimensional of the inference filter.

The processor 200 or the processor 300 may include a fourth convolution module including an application specific module or processor that applies the fourth convolution or filtering. The training convolutional module 169 or the inference convolutional module 171 is an example means for applying the fourth convolution.

At act S115, the processor 200 or the processor 300 classifies the at least the portion of the camera-captured image as an object category in response to an output of the second convolutional neural network.

The processor is also configured to train the various convolutional layers and deconvolutional layers using a ground truth data set that includes known values for the object categories.

The processor 200 or the processor 300 may include a classification module including an application specific module or processor that applies the fourth convolution or filtering.

Figure 23:
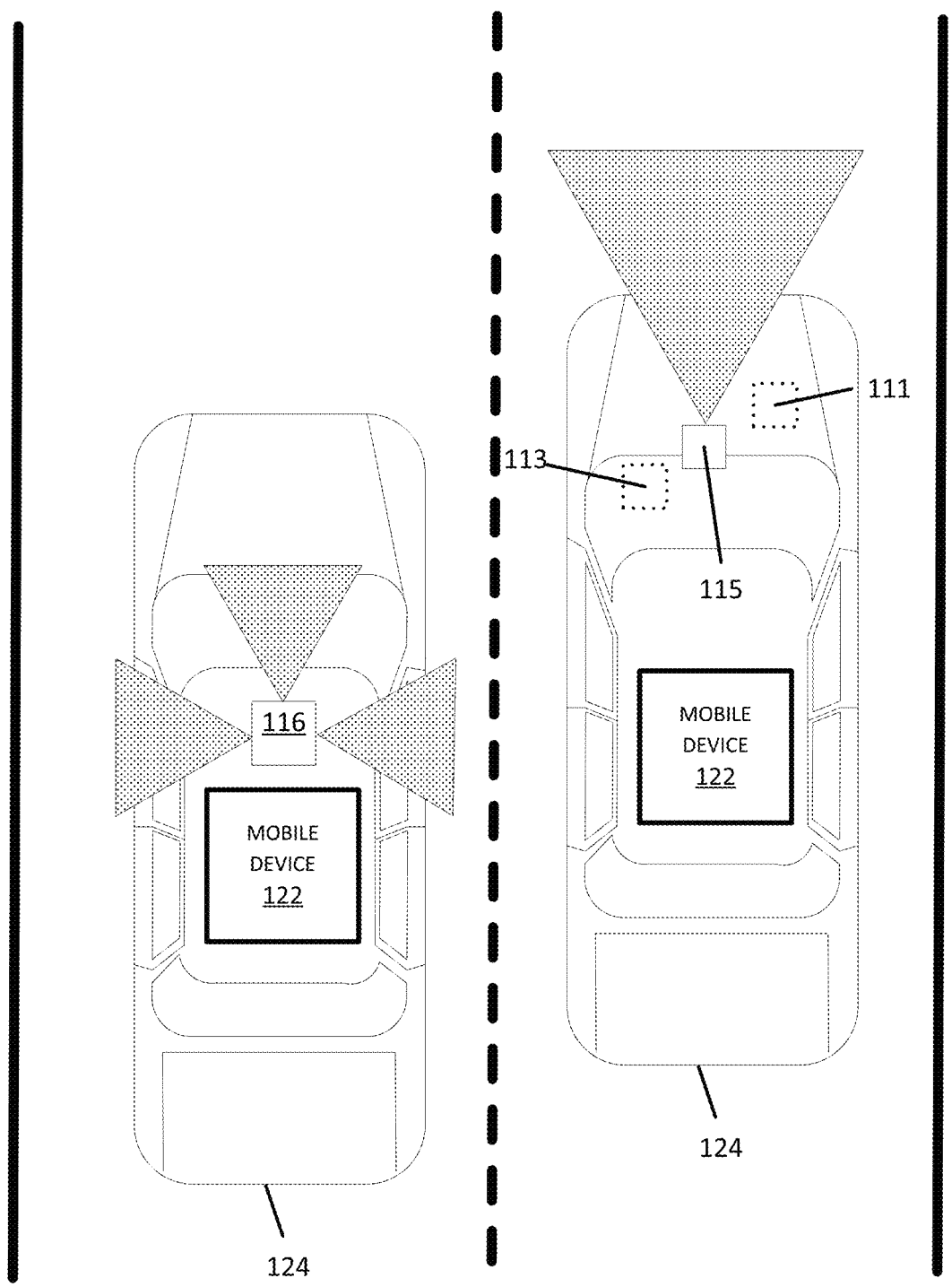
FIG. 23 illustrates exemplary vehicles of the systems of FIG. 1.

FIG. 23 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the object classifications and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the object classifications and other geographic data received from geographic database 123 and the server 125 to generate driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the object classifications and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the object classifications and other geographic data received from geographic database 123 and the server 125 to generate driving commands or navigation commands.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 24:
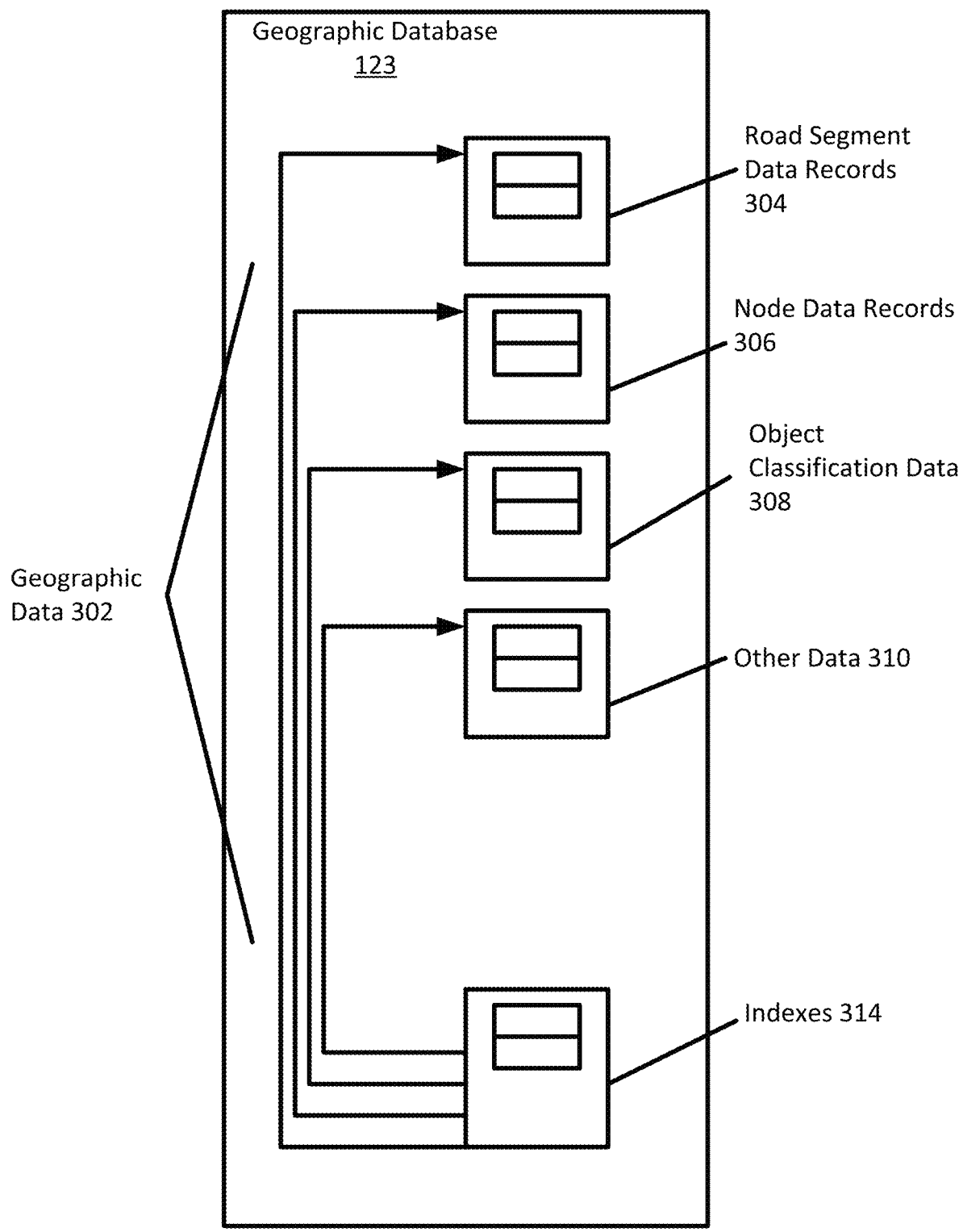
FIGS. 24 and 25 illustrate example geographic databases.

In FIG. 24, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate object classification data 308 with a road segment in the segment data records 304 or a geographic coordinate. An index 314 may, for example, store object classification data 308 relating to one or more objects that have been identified from the convolutional and deconvolutional neural network devices described herein.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 25:
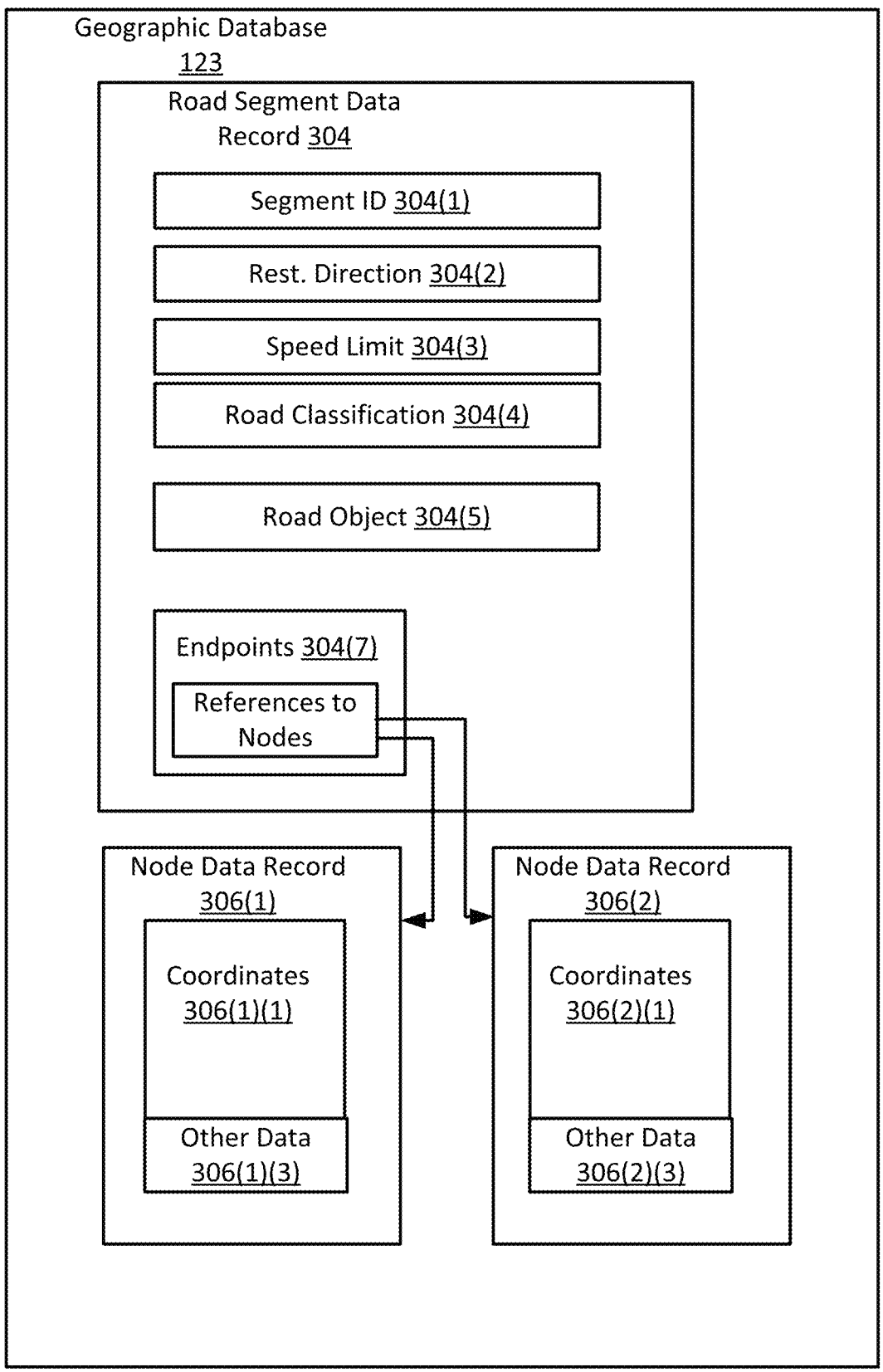

FIG. 25 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size.

The road objects may be objects in the road or in the vicinity of the road. The road objects may be stored with a classification field according to the object classifications calculated from the neural network pipeline. Example object classifications are provided in Table 1. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 25 also shows some of the components of a node data record 306 that may be contained in the geographic database 123. Each of the node data records 306 may have associated information (such as "attributes", "fields", etc.)

that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for encoding objects in a camera-captured image with a deep neural network pipeline, the method comprising:
  identifying at least a portion of the camera-capture image;
  applying a first convolutional neural network to the at least the portion of the camera-captured image at a first stage;

pooling, at a second stage, a plurality of subregion representations from an output of the first convolutional neural network for the first stage;

performing, at a third stage, at least one convolution of an output of the second stage;

performing, at a fourth stage, at least one deconvolution from the output of the first stage or the output of the second stage;

concatenating, at a fifth stage, the output of the fourth stage and the output of the third stage;

applying a second convolutional neural network to the output of the fifth stage; and classifying the at least the portion of the camera-captured image as an object category in response to an output of the second convolutional neural network.

Embodiment 2

The method of embodiment 1, wherein the at least one deconvolution from the output of the first stage or the output of the second stage further comprises:

a first deconvolution from the output of the first stage; and a second deconvolution from the output of the second stage.

Embodiment 3

The method of embodiment 1 or 2, further comprising:

concatenating an output of the second deconvolution with the output of the first stage to provide a concatenated input for the first deconvolution.

Embodiment 4

The method of any of embodiments 1 to 3, further comprising:

performing, at the fourth stage, a third deconvolution from an output of the third stage.

Embodiment 5

The method of any of embodiments 1 to 4, further comprising:

concatenating an output of the third deconvolution with the output of the second stage to provide a concatenated input for the second deconvolution.

Embodiment 6

The method of any of embodiments 1 to 5, wherein pooling the plurality of subregion representations comprises:

calculating a large image block at a first level of coarseness; and calculating a small image block at a second level of coarseness.

Embodiment 7

The method of any of embodiments 1 to 6, wherein the plurality of subregion representations comprises a pyramid of blocks having varying objects or varying detail levels.

Embodiment 8

The method of any of embodiments 1 to 7, further comprising:

training the second convolutional neural network using the output of the fifth stage and a ground truth data set.

Embodiment 9

The method of any of embodiments 1 to 8, wherein the ground truth data set includes a plurality of predetermined object categories.

Embodiment 10

The method of any of embodiments 1 to 9, further comprising:

sending the object category to a vehicle system.

Embodiment 11

The method of any of embodiments 1 to 10, wherein the vehicle system provides navigation in response to the object category.

Embodiment 12

The method of any of embodiments 1 to 11, wherein the vehicle system provides assisted or autonomous driving in response to the object category.

Embodiment 13

The method of any of embodiments 1 to 12, further comprising:

upsampling the output of the fifth stage to match a resolution of the camera-captured image.

Embodiment 14

The method of any of embodiments 1 to 13, further comprising:

inserting padding values in between at least row or at least one column in the output of the first stage or the output of the second stage comprises, wherein the padding values and the output of the first stage or the output of the second stage are applied to the at least one deconvolution.

Embodiment 15

The method of any of embodiments 1 to 14, wherein the performing the at least one convolution of an output of the second stage further comprises:

performing, at the third stage, a first third stage convolution including a set of weights;

performing, at the third stage, a second third stage convolution from an output of the first third stage convolution and initialized using the set of weights from the first third stage convolution and defined before the second third stage convolution is performed.

Embodiment 16

The method of any of embodiments 1 to 15, further comprising:
  expanding dimensions of a filter from the fifth stage; and
  performing a final stage convolution on the output of the fifth stage using the expanded dimensions of the filter from the fifth stage.

Embodiment 17

The method of any of embodiments 1 to 16, wherein the deep neural network pipeline includes a plurality of paths including:
  a first prong from the first stage through the fourth stage for low level features and shallow layers; and
  a second prong from the first stage through the second stage, the third stage, and the fourth stage for upsampling.

Embodiment 18

The method of any of embodiments 1 to 17, wherein the plurality of paths includes:
  a third prong from the first stage through the second stage, the third stage, and the fifth stage for pyramidal pooling.

Embodiment 19

An apparatus, configured to perform and/or control the method of any of embodiments 1-18 or comprising means for performing and/or controlling any of embodiments 1-18.

Embodiment 20

An apparatus, comprising at least one processor and at least one memory including computer program code for one or more programs, the at least one memory and the computer program code configured to, with the at least one processor, to perform and/or control the method of any of embodiments 1-18.

Embodiment 21

A computer program comprising instructions operable to cause a processor to perform and/or control the method of any of embodiments 1-18, when the computer program is executed on the processor.

We claim:

1. A method for encoding objects in a camera-captured image with a deep neural network pipeline, the method comprising:
  identifying at least a portion of the camera-captured image corresponding to a surrounding of a vehicle;
  applying a first convolutional neural network to the at least the portion of the camera-captured image at a first stage;
  pooling, at a second stage, a plurality of subregion representations from an output of the first convolutional neural network for the first stage;
  performing, at a third stage, at least one convolution of an output of the second stage;
  performing, at a fourth stage, a first deconvolution from the output of the first stage and a second deconvolution from the output of the second stage;
  performing, at the fourth stage, a third deconvolution from an output of the third stage;
  concatenating, at a fifth stage, the output of the fourth stage and the output of the third stage;
  applying a second convolutional neural network to the output of the fifth stage; and
  classifying the at least the portion of the camera-captured image as an object category from a predetermined list of road objects in response to an output of the second convolutional neural network.

2. The method of claim 1, further comprising:
  concatenating an output of the second deconvolution with the output of the first stage to provide a concatenated input for the first deconvolution.

3. The method of claim 1, further comprising:
  concatenating an output of the third deconvolution with the output of the second stage to provide a concatenated input for the second deconvolution.

4. The method of claim 1, wherein pooling the plurality of subregion representations comprises:
  calculating a large image block at a first level of coarseness; and
  calculating a small image block at a second level of coarseness.

5. The method of claim 4, wherein the plurality of subregion representations comprises a pyramid of blocks having varying objects or varying detail levels.

6. The method of claim 1, further comprising:
  training the second convolutional neural network using the output of the fifth stage and a ground truth data set.

7. The method of claim 6, wherein the ground truth data set includes a plurality of predetermined object categories.

8. The method of claim 1, further comprising:
  sending the object category to a vehicle system.

9. The method of claim 8, wherein the vehicle system provides navigation in response to the object category.

10. The method of claim 8, wherein the vehicle system provides assisted or autonomous driving in response to the object category.

11. The method of claim 1, further comprising:
  upsampling the output of the fifth stage to match a resolution of the camera-captured image.

12. The method of claim 1, further comprising:
  inserting padding values in between at least row or at least one column in the output of the first stage or the output of the second stage comprises, wherein the padding values and the output of the first stage or the output of the second stage are applied to the first deconvolution or the second deconvolution.

13. The method of claim 12, wherein the performing the at least one convolution of an output of the second stage further comprises:
  performing, at the third stage, a first third stage convolution including a set of weights;
  performing, at the third stage, a second third stage convolution from an output of the first third stage convolution and initialized using the set of weights from the first third stage convolution and defined before the second third stage convolution is performed.

14. The method of claim 1, further comprising:
  expanding dimensions of a filter from the fifth stage; and
  performing a final stage convolution on the output of the fifth stage using the expanded dimensions of the filter from the fifth stage.

15. The method of claim 1, wherein the deep neural network pipeline includes a plurality of paths including:
- a first prong from the first stage through the fourth stage for low level features and shallow layers; and
- a second prong from the first stage through the second stage, the third stage, and the fourth stage for upsampling.

16. The method of claim 15, wherein the plurality of paths includes:
- a third prong from the first stage through the second stage, the third stage, and the fifth stage for pyramidal pooling.

17. A non-transitory computer readable medium including instructions that when executed by a process are configured to:
- identify at least a portion of an image collected at a vehicle;
- applying a first convolutional neural network to the at least the portion of the image at a first stage;
- pooling, at a second stage, a plurality of subregion representations from an output of the first convolutional neural network for the first stage;
- performing, at a third stage, at least one convolution of an output of the second stage;
- performing, at a fourth stage, a first deconvolution from the output of the first stage and a second deconvolution from the output of the second stage;
- performing, at the fourth stage, a third deconvolution from an output of the third stage;
- concatenating, at a fifth stage, the output of the fourth stage and the output of the third stage;
- applying a second convolutional neural network to the output of the fifth stage; and
- classifying the at least the portion of the image as a road object category in response to an output of the second convolutional neural network.

18. An apparatus for encoding objects in a camera-captured image with a deep neural network pipeline, the method comprising:
- at least one processor; and
- at least one memory including computer program code for one or more programs, the at least one memory and the computer program code configured to, with the at least one processor, cause the apparatus to perform at least the following:
- identifying at least a portion of the camera-captured image;
- applying a first convolutional neural network to the at least the portion of the camera-captured image at a first stage;
- pooling, at a second stage, a plurality of subregion representations from an output of the first convolutional neural network for the first stage;
- performing, at a third stage, at least one convolution of an output of the second stage;
- performing, at a fourth stage, a first deconvolution from the output of the first stage, a second deconvolution from the output of the second stage, and a third deconvolution from an output of the third stage;
- concatenating, at a fifth stage, the output of the fourth stage and the output of the third stage;
- applying a second convolutional neural network to the output of the fifth stage; and
- classifying the at least the portion of the camera-captured image as an object category in response to an output of the second convolutional neural network.

* * * * *